US009403933B2

(12) United States Patent
Ristoski et al.

(10) Patent No.: US 9,403,933 B2
(45) Date of Patent: *Aug. 2, 2016

(54) CURABLE COMPOSITIONS CONTAINING ISOCYANATE FUNCTIONAL COMPONENTS HAVING IMPROVED DURABILITY

(75) Inventors: Toni Ristoski, Shelby Township, MI (US); Gary L Jialanella, Oxford, MI (US); Michael Frishcosy, Fishers, IN (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/353,429

(22) PCT Filed: Jun. 7, 2012

(86) PCT No.: PCT/US2012/041320
§ 371 (c)(1),
(2), (4) Date: Apr. 22, 2014

(87) PCT Pub. No.: WO2013/077908
PCT Pub. Date: May 30, 2013

(65) Prior Publication Data
US 2014/0290855 A1 Oct. 2, 2014

Related U.S. Application Data

(63) Continuation-in-part of application No. PCT/US2011/062070, filed on Nov. 23, 2011.

(60) Provisional application No. 61/424,943, filed on Dec. 20, 2010.

(51) Int. Cl.
*B29C 65/00* (2006.01)
*B29C 65/48* (2006.01)
(Continued)

(52) U.S. Cl.
CPC .............. *C08G 18/778* (2013.01); *B29C 65/00* (2013.01); *B29C 65/48* (2013.01); *B29C 65/485* (2013.01);
(Continued)

(58) Field of Classification Search
CPC ...... B29C 65/00; B29C 65/48; B29C 65/485; B29C 65/4865; B29C 65/487; B29C 65/4875; B60J 1/00; B32B 17/00; B32B 17/061; B32B 17/10; B32B 27/00; B32B 27/40; B32B 37/00; B32B 37/12; B32B 2419/00; B32B 2605/00; C08J 3/18; C08J 3/20; C08J 3/24; C08J 3/241; C08J 5/124; C08J 175/02; C08J 2375/00; C08J 2375/04; C08K 3/00; C08K 3/0016; C08K 3/0033; C08K 3/0041; C08K 3/04; C08K 5/00; C08K 5/0016; C08K 5/0025; C08K 5/005; C08K 5/32; C08K 5/34; C08K 5/3435; C08K 13/02; C08L 75/00; C08L 75/02; C08L 75/04; C08L 2201/08; C08L 2312/00; C08L 2312/08; C09J 5/00; C09J 9/00; C09J 11/00; C09J 11/04; C09J 11/06; C09J 175/00; C09J 175/02; C09J 175/04; C09J 2400/10; C09J 2400/143; C09J 2400/163; C09J 2475/00; C09J 175/12; E06B 3/56; E06B 3/64; C08G 18/778; C08G 18/10; C08G 18/12; C08G 18/2081
USPC .................. 52/204.62; 156/99, 106, 108, 295, 156/331.4, 331.7, 329; 524/99, 186, 495, 524/496, 588, 589, 590, 869; 528/27, 28, 528/29, 44, 65, 73, 85; 428/423.1, 425.6
See application file for complete search history.

(56) References Cited

U.S. PATENT DOCUMENTS 3,474,068 A 10/1969 Murayuma
3,707,521 A 12/1972 De Santis
(Continued)

FOREIGN PATENT DOCUMENTS

EP 1433802 B1 12/2002
JP 59/102950 6/1984
(Continued)

OTHER PUBLICATIONS

Determinationa of active HALS in weathered automotive paint systems I. Development of ESR based analytical techniques, A.V. Kucherov. Oct. 30, 1999.
(Continued)

*Primary Examiner* — Patrick Niland
(74) *Attorney, Agent, or Firm* — The Dobrusin Law Firm, P.C.

(57) ABSTRACT

A composition comprising a) one or more isocyanate functional components, one or more oligomers or prepolymers containing isocyanate functional groups and alkoxysilane groups, or prepolymers having a flexible backbone and silane moieties capable of silanol condensation: b) one or more catalysts for the reaction of isocyanate moieties with active hydrogen atom containing groups or for silanol condensation; c) one or more compounds comprising a dihydrocarbyl hydroxyl amine, an alicyclic hydroxyl amine, a nitrile oxide of a dihydrocarbyl hydroxyl amine or a nitrile oxide of an alicyclic hydroxyl amine in a sufficient amount to enhance the ultraviolet stability of the composition in a cured state; and d) a pigment that does not have reinforcing properties or the composition contains one of one or more oligomers or prepolymers containing isocyanate functional groups and alkoxysilane groups, or prepolymers having a flexible backbone and silane moieties capable of silanol condensation. The compositions are useful as adhesives and sealers.

14 Claims, 11 Drawing Sheets

(51) Int. Cl.

| | | |
|---|---|---|
| *B32B 17/00* | (2006.01) | |
| *B32B 17/06* | (2006.01) | |
| *B32B 17/10* | (2006.01) | |
| *B32B 27/00* | (2006.01) | |
| *B32B 27/40* | (2006.01) | |
| *B32B 37/00* | (2006.01) | |
| *B32B 37/12* | (2006.01) | |
| *B60J 1/00* | (2006.01) | |
| *C08G 18/10* | (2006.01) | |
| *C08G 18/12* | (2006.01) | |
| *C08G 18/20* | (2006.01) | |
| *C08G 18/77* | (2006.01) | |
| *C08K 3/04* | (2006.01) | |
| *C08K 5/00* | (2006.01) | |
| *C08L 75/04* | (2006.01) | |
| *C09J 5/00* | (2006.01) | |
| *C09J 175/02* | (2006.01) | |
| *C09J 175/04* | (2006.01) | |
| *C09J 175/12* | (2006.01) | |
| *E06B 3/56* | (2006.01) | |
| *E06B 3/64* | (2006.01) | |
| *C08K 5/32* | (2006.01) | |
| *C08K 5/3435* | (2006.01) | |
| *C08K 13/02* | (2006.01) | |

(52) U.S. Cl.
CPC ........... *B29C 65/487* (2013.01); *B29C 65/4865* (2013.01); *B29C 65/4875* (2013.01); *B32B 17/00* (2013.01); *B32B 17/061* (2013.01); *B32B 17/10* (2013.01); *B32B 27/00* (2013.01); *B32B 27/40* (2013.01); *B32B 37/00* (2013.01); *B32B 37/12* (2013.01); *B60J 1/00* (2013.01); *C08G 18/10* (2013.01); *C08G 18/12* (2013.01); *C08G 18/2081* (2013.01); *C08K 5/3435* (2013.01); *C08K 13/02* (2013.01); *C08L 75/04* (2013.01); *C09J 5/00* (2013.01); *C09J 175/02* (2013.01); *C09J 175/04* (2013.01); *C09J 175/12* (2013.01); *E06B 3/56* (2013.01); *E06B 3/64* (2013.01); *C08K 3/04* (2013.01); *C08K 5/005* (2013.01); *C08K 5/32* (2013.01)

(56) References Cited

U.S. PATENT DOCUMENTS

| | | |
|---|---|---|
| 3,779,794 A | 12/1973 | De Santis |
| 3,926,909 A | 12/1975 | Wei |
| 4,374,237 A | 2/1983 | Berger et al. |
| 4,525,511 A | 6/1985 | Kirby et al. |
| 4,538,920 A | 9/1985 | Drake |
| 4,687,533 A | 8/1987 | Rizk et al. |
| 4,780,520 A | 10/1988 | Rizk et al. |
| 5,063,269 A | 11/1991 | Hung |
| 5,082,147 A | 1/1992 | Jacobs |
| 5,164,473 A * | 11/1992 | Dormish et al. ............... 528/44 |
| 5,603,798 A * | 2/1997 | Bhat .......................... 156/331.4 |
| 5,623,044 A | 4/1997 | Chiao |
| 5,852,137 A | 12/1998 | Hsieh et al. |
| 5,922,809 A | 7/1999 | Bhat et al. |
| 5,976,305 A | 11/1999 | Bhat et al. |
| 6,015,475 A | 1/2000 | Hsieh et al. |
| 6,355,838 B1 | 3/2002 | Huffman et al. |
| 6,512,033 B1 | 1/2003 | Wu |
| 6,709,539 B2 | 3/2004 | Zhou |
| 6,965,008 B2 | 11/2005 | Symietz et al. |
| 7,910,642 B2 | 3/2011 | Mader et al. |
| 2002/0086743 A1* | 7/2002 | Bulpett et al. ................ 473/371 |
| 2002/0100550 A1 | 8/2002 | Mahdi et al. |
| 2006/0270807 A1 | 11/2006 | Zhu et al. |
| 2007/0072965 A1 | 3/2007 | Kanouni et al. |
| 2008/0057316 A1* | 3/2008 | Landon et al. ............. 428/423.1 |
| 2008/0058478 A1 | 3/2008 | Kuntimaddi et al. |
| 2008/0139686 A1 | 6/2008 | Sugiyama et al. |
| 2009/0005498 A1 | 1/2009 | Lin et al. |
| 2009/0247720 A1 | 10/2009 | Wang et al. |
| 2013/0233488 A1* | 9/2013 | Jialanella et al. .......... 156/331.7 |

FOREIGN PATENT DOCUMENTS

| | | |
|---|---|---|
| JP | 2002/234996 A2 | 8/2002 |
| JP | 2005/298812 | 10/2005 |
| JP | 2006/016575 | 1/2006 |
| SU | 468/939 A1 | 4/1975 |
| WO | 98/40360 A1 | 9/1998 |
| WO | WO 2007/039434 * | 4/2007 |

OTHER PUBLICATIONS

39 Anaerobic Adhesives. Richard D. Rich Copyright 2003.
Mechanisms of Action and Reactivities of the Fare Radicals of Inhibitors. Evgenity T. Denisov Aug. 1, 1986.
Hahner, U. Studies on the Thermooxidation of Ethers ad Polyethers: Part 1—The Unihibited Themooxidation of Polyether *Polymer Degradation and Stability* 34. (1991).
Pospisil, Jan. *Oxidation Inhibition in Organic Materials*, vol. 1, Boca Raton, Florida: CRC Press, 1990.
Product Data Sheet BNX (TM) 2000. Mayzo, Inc.(www.mayzo.com).
International Preliminary Report on Patentability dated Mar. 19, 2014 PCT/US2012/041320.
Search Report and Written Opinion dated Jan. 7, 2013 PCT/US2012/041320.

* cited by examiner

US 9,403,933 B2

CURABLE COMPOSITIONS CONTAINING ISOCYANATE FUNCTIONAL COMPONENTS HAVING IMPROVED DURABILITY

CLAIM OF PRIORITY

This application is a national phase filing under 35 USC §371 from PCT Application serial number PCT/US2012/041320 filed on Jun. 7, 2012, and claims priority therefrom. This application further claims priority from and is a continuation in part of PCT Application PCT/US2011/062070 filed Nov. 23, 2011, which claims priority from provisional application Ser. No. 61/424,943 filed Dec. 20, 2010 from which this application also claims priority, all incorporated herein by reference in their entirety.

FIELD OF THE INVENTION

The invention relates to curable compositions containing isocyanate functional components which exhibit improved durability; methods of preparing molded products, foams, sealers and adhesives based on such curable compositions; and bonding or sealing gaps between substrates utilizing the compositions.

BACKGROUND OF THE INVENTION

Compositions having isocyanate functional components are utilized in a variety of useful products such as adhesives, sealers, molded products and foams, which may be utilized in construction, vehicle manufacture, assembly of electronic subassemblies and devices, toys and the like. The adhesives have found widespread use because they provide reasonable processing conditions and exhibit good adhesion to many substrates, such bonding windows into structures, or parts to a structure. In automotive assembly plants windows are bonded in with one part adhesive compositions containing isocyanate functional components and a cure catalyst. One part adhesives cure as a result of exposure to moisture and are protected from moisture until applied to a substrate and the dispensing equipment is less complex than the equipment used to apply two-part adhesives. One part moisture curing adhesives known in the art are disclosed in U.S. Pat. No. 4,374,237, U.S. Pat. No. 4,687,533, U.S. Pat. No. 4,780,520, U.S. Pat. No. 5,063,269, U.S. Pat. No. 5,623,044, U.S. Pat. No. 5,603,798, U.S. Pat. No. 5,852,137, U.S. Pat. No. 5,922,809, U.S. Pat. No. 5,976,305, U.S. Pat. No. 5,852,137 and U.S. Pat. No. 6,512,033, relevant portions incorporated herein by reference and examples include BETASEAL™ 15630, 15625, 61355 adhesives available from The Dow Chemical Company, EFBOND™ windshield adhesives available from Eftec, WS 151™, WS212™ adhesives available from Yokohama Rubber Company, and SIKAFLEX™ adhesives available from Sika.

Two-part polyisocyanate based adhesives comprise, in one part, a polyisocyanate or an isocyanate functional prepolymer and in a second part a curing agent and catalyst for the reaction. Two part adhesives can be used for bonding replacement windows into vehicles, bonding parts together or parts to structures. Examples of such systems include the adhesive systems disclosed in the commonly owned U.S. Pat. No. 7,892,395; U.S. Pat. No. 6,965,008; EP 1433802 and EP 1578834, all incorporated herein by reference. The adhesives start to cure when the two parts are contacted and cure much faster than one-part adhesives.

Such products can undergo degradation in properties with use and exposure to natural elements, such as sunlight, humidity and thermal cycling. To reduce or prevent this from occurring stabilizers are commonly added to the formulations utilized to prepare cured polyurethanes. See for example Wu U.S. Pat. No. 6,512,033 and Zhu et al. United States Patent Application 2006/0270807 paragraphs 0043 to 0046.

Due to market conditions manufacturers of isocyanate based compositions may need to change ingredients utilized in the curable compositions (such as adhesives). Many compositions containing isocyanate functional prepolymers are sensitive systems in that changes in ingredients can alter how the adhesive compositions function or perform. Some ingredients such as fillers, plasticizers, thixotropes and the like when changed can impact how curable compositions function and the durability of the compositions. Such changes may result in stabilizer packages becoming ineffective in the altered composition.

Curable compositions that exhibit improved durability are desired. There is a need for compositions (e.g. adhesive) containing isocyanate functional prepolymers which have improved stabilizer packages to replace known stabilization packages which are found not to function properly, especially in compositions where ingredients (such as fillers and/or plasticizers) have been changed. Such compositions exhibit good durability in use and tests designed to predict long term durability. Cost effective systems for enhancing the durability of such compositions when exposed to environmental conditions, such as ultraviolet light, are needed.

SUMMARY OF THE INVENTION

The invention is a composition comprising: a) one or more of one or more isocyanate functional components, one or more oligomers or prepolymers containing isocyanate functional groups and alkoxysilane groups and one or more prepolymers having a flexible backbone and silane moieties capable of silanol condensation; b) one or more catalysts for the reaction of isocyanate moieties with active hydrogen atom containing groups and/or silanol condensation; c) one or more compounds comprising a dihydrocarbyl hydroxyl amine, an alicyclic hydroxyl amine, a nitrile oxide of a dihydrocarbyl hydroxyl amine or a nitrile oxide of an alicyclic hydroxyl amine in a sufficient amount to enhance the ultraviolet stability of the composition in a cured state; and d) a pigment that does not have reinforcing properties and/or is non-black. In some embodiments the pigment is a white pigment, such as titanium dioxide. The composition can be a one part or two part curable composition.

The composition may comprise: a) one or more isocyanate functional components, one or more oligomers or prepolymers containing isocyanate functional and alkoxysilane groups or prepolymers having a flexible backbone and silane moieties capable of silanol condensation; b) one or more catalysts for the reaction of isocyanate moieties with active hydrogen atom containing groups or silanol condensation; c) one or more compounds comprising a dihydrocarbyl hydroxyl amine, an alicyclic hydroxyl amine, a nitrite oxide of a dihydrocarbyl hydroxyl amine or a nitrile oxide of an alicyclic hydroxyl amine in a sufficient amount to enhance the ultraviolet stability of the composition in a cured state; wherein a portion or all of part a) comprises one or more oligomers or prepolymers containing isocyanate functional groups and alkoxysilane groups.

The invention may relate to two part compositions wherein part 1 comprises one or more isocyanate functional components and one or more oligomers and/or prepolymers containing isocyanate functional groups and alkoxysilane groups; part 2 comprises one or more catalysts for the reaction of isocyanate moieties with active hydrogen atom containing groups and a curing agent comprising one or more components containing more than one active hydrogen containing groups; wherein the one or more compounds comprising a dihydrocarbyl hydroxyl amine, an alicyclic hydroxyl amine, a nitrile oxide of a dihydrocarbyl hydroxyl amine or a nitrile oxide of an alicyclic hydroxyl amine may be present in part 1, part 2 or both. The curing agent is preferably one or more of polyols, polyamines, crosslinking agents and chain extenders.

The invention further relates to a method of bonding two or more substrates together comprising contacting the two or more substrates together with a composition of the invention disposed along at least a portion of the area wherein the substrates are in contact. Preferably, one of the substrates is window glass or abrasion coated transparent plastic and the other substrate is a building or a vehicle or two components to be bonded together, such as a vehicle and its components such as parts of a trunk, two body panels, two door components, and the like. In two part compositions, the two parts are contacted prior to contacting the curable composition with the surface of one or more of the substrates.

The invention may further relate to a method comprising applying a composition of the invention along adjoining surfaces of two components in a structure and allowing the composition to cure such that the space between the adjoining surfaces is sealed. The invention also relates to a method for making a reaction injected molded part comprising injecting a composition as described herein into a mold and subjecting the components to conditions, such as suitable temperatures and pressures, to form a molded part. Such parts may be utilized in automobiles, for example as body parts, fascia and trim. The two part compositions may comprise one or more known blowing agents. The compositions may be sprayed or injected into molds under conditions such that open or closed cell polyurethane foams are prepared. The foams can be used as insulation foams, seating cushions, headliners or molded parts.

The compositions are useful in any known use of curable compositions containing isocyanate functional components or compositions containing silanol moieties capable of silanol condensation, such as coatings, adhesives, open and closed cell foams, molded products and the like. The curable compositions may be used as an adhesive to bond substrates together, which may be similar and dissimilar, for instance, plastics, glass, wood, ceramics, metal, coated substrates and the like. They may be used to bond glass or transparent plastic structures to other substrates such as vehicles and buildings; and parts of modular components together, such as vehicle modular components. The compositions exhibit excellent durability and ultraviolet stability once cured, that is the cured compositions resist degradation. These compositions demonstrate excellent properties in accelerated aging tests. Structures bonded together utilizing such adhesive compositions remain bonded together for a substantial portion or all of the structures useful life. In some embodiments the compositions are formulated to be self-leveling.

DETAILED DESCRIPTION

Figure 1:
FIG. 1 is a micrograph of a composition without stabilizers coated on an e-coated panel after 1000 hours of Weather-O-Meter exposure.

The explanations and illustrations presented herein are intended to acquaint others skilled in the art with the invention, its principles, and its practical application. Those skilled in the art may adapt and apply the invention in its numerous forms, as may be best suited to the requirements of a particular use. The specific embodiments of the present invention as set forth are not intended as being exhaustive or limiting of the invention. The scope of the invention should be determined not with reference to the above description, but should be determined with reference to the appended claims, along with the full scope of equivalents to which such claims are entitled. Other combinations are also possible as will be gleaned from the following claims, which are hereby incorporated by reference into this written description.

One or more means that at least one, or more than one, of the recited components may be used. Nominal with respect to functionality means the theoretical functionality, this can be calculated from the stoichiometry of the ingredients used. Generally, the actual functionality is different due to imperfections in raw materials, incomplete conversion of the reactants and formation of by-products. Durability means that the composition once cured remains sufficiently strong to perform its designed function, for instance the adhesive holds substrates together, for the life or most of the life of the structure containing the cured composition. As an indicator of this durability the curable composition (e.g. adhesive) preferably exhibits excellent results during accelerated aging testing. Isocyanate content means the weight percentage of isocyanate moieties based on the total weight of the prepolymer. The term isocyanate-reactive compound means any organic compound having nominally at least two isocyanate-reactive moieties, including active hydrogen containing moieties, and preferably refer to moieties containing a hydrogen atom which, because of its position in the molecule, displays significant activity according to the Zerewitinoff test described by Wohler in the *Journal of the American Chemical Society*, Vol. 49, p. 3181 (1927). Illustrative of such isocyanate reactive moities, are —COOH, —OH, —NH$_2$, —NH—, —CONH$_2$, —SH, and —CONH—. Preferable isocyanate reactive moiety containing compounds include polyols, polyamines, polymercaptans and polyacids, more preferably polyols, and most preferably polyether polyols. Sealers are products that fill gaps between two substrates, which products cure to seal the gaps. Reactive means that the curable composition contains components which react to form a polymeric matrix that is set irreversibly once cured.

The compositions may further comprise one or more of the following features in any combination: one or more fillers; the pigment is a non-black pigment, is not carbon black, is a white pigment, and/or is titanium dioxide; one or more plasticizers, preferably branched plasticizers; hydroxyl amine or nitrile oxide is present in an amount of about 0.01 to about 2.0 percent by weight of the composition; the one or more hydroxyl amines correspond to the formula $(R^1)_2N$—OH and the nitrile oxides correspond to the formula $(R^1)_2$—N—O. wherein $R^1$ is as described hereinafter; component c is a nitrile oxide; the nitrile oxide is the nitrile oxide derived from 1,4-dihydroxy-2,2,6,6-tetramethylpiperidine; the one or more isocyanate functional components, one or more oligomers or prepolymers containing isocyanate functional groups and alkoxysilane groups or prepolymers having a flexible backbone and silane moieties capable of Silanol condensation are present in an amount of about 20 to about 70 percent by weight; the one or more catalysts are present in an amount of about 0.005 to about 2 percent by weight; the one or more pigments are present in an amount of about 0.0.1 to about 25 percent by weight; the one or more plasticizers are present in an amount of about 5 to about 40 percent by weight; the one or more fillers are present in an amount of about 5 to about 75 percent by weight; wherein a) comprises one or more isocyanate functional components and one or more of an oligomer or prepolymer containing isocyanate functional groups and alkoxysilane groups, the one or more of an oligomer or prepolymer containing isocyanate functional groups and alkoxysilane groups are present in an amount of about 1 percent by weight to less than 70 percent by weight; a rheology modifier; the flexibile backbone of the prepolymers having a flexible backbone and silane moieties capable of silanol condensation comprises a polyether or polyolefin backbone; a second ultraviolet light stablilizer; and comprises one or more isocyanate functional components and one or more catalysts for the reaction of isocyanate moieties with isocyanate reactive groups.

The methods of the invention may further comprise one or more of the following features in any combination: the composition is a two part composition and the parts are contacted together prior to contacting the composition with one or more of the substrates; at least one of the substrates is a nonstructural component and at least one of the other substrates is a building or a vehicle; at least one of the substrates is a trim component and at least one of the other substrates is a building or a vehicle; and the Structure is a vehicle where a seam exists between two substrates such as a trunk, two or more body panels, two or more door components, floor boards, sidewalls, windows and the surrounding structure.

The compositions can be any reactive system containing isocyanate functional components, one or more oligomers or prepolymers containing isocyanate functional groups and alkoxysilane groups, prepolymers having a flexible backbone and silane moieties capable of silanol condensation or mixtures thereof which are curable and may be one or two-part systems, preferably one part systems. Preferably the curable systems are useful as adhesives or sealers. Preferably the compositions contain one or both of isocyanate functional components and one or more oligomers or prepolymers containing isocyanate functional groups and alkoxysilane groups.

Isocyanate based (polyurethane or polyurea forming) curable systems comprise one or more isocyanate functional components. An isocyanate functional component contains one or more compounds having on average more than one isocyanate functional group per molecule. The isocyanate functional compound can be any compound which contains on average more than one isocyanate moiety, and can be in the form of one or more isocyanate functional prepolymers, one or more oligomers or prepolymers containing isocyanate functional groups and alkoxysilane groups, monomers or oligomers having on average greater than 1 isocyanate group, and preferably 2 or more isocyanate groups and mixtures thereof. An isocyanate prepolymer can by any prepolymer prepared by reaction of an isocyanate functional compound with one or more compounds having on average more than one isocyanate reactive functional moieties under conditions such that the prepolymer prepared have on average more than one isocyanate moiety (group) per molecule. The isocyanate functional component is present in the curable composition in a sufficient amount to form a cured component when exposed to curing conditions. In a one-part system the isocyanate functional component further comprises a catalyst and other components as described hereinafter. The one component adhesive systems typically cure by moisture curing and once formulated are packaged in air and moisture proof containers to prevent curing before application. In adhesive compositions, the adhesive is capable of bonding substrates together such that the substrates remain bound together when exposed to temperatures of about −30° C. to about 100° C. for long periods of time, such as 10 years; and up to temperatures of about 180° C. for short periods, up to 30 minutes.

In a two-part curable system, the two parts are reactive with one another and when contacted undergo a curing reaction. One part of the composition comprises, or contains, one or more of an isocyanate functional components, one or more oligomers or prepolymers containing isocyanate functional groups and alkoxysilane groups, and prepolymers having a flexible backbone and si lane moieties capable of silanol condensation or mixtures thereof. This is referred to as the resin side or A side. The other component of the composition is a component reactive with the functional groups of the A side material, an isocyanate reactive component which comprises, or contains, one or more compounds, oligomers or prepolymers having on average more than one group reactive with isocyanate moieties as described herein or moieties capable of silanol condensation. The second part is known as the curative or B side. Compounds having on average one or more isocyanate reactive groups or silanol condensing groups can be prepolymers, small chain compounds such as difunctional chain extenders or polyfunctional crosslinking agents, or mixtures thereof. A catalyst as described hereinbefore may be utilized in the curative side. The reaction product is a cured product which is capable of performing the desired function, such as bonding certain substrates together or sealing a gap.

The one or more isocyanate functional components are present in sufficient quantity to provide cohesive strength, and in adhesive uses, adhesive character to the cured compositions. Such isocyanate functional components have an average isocyanate functionality sufficient to allow the preparation of a crosslinked polyurethane upon cure and not so high that the isocyanate functional components are unstable. The isocyanate functional prepolymers are prepared by reacting one or more polyisocyanates with one or more compounds containing on average more than one isocyanate reactive group per molecule. The isocyanate functional components preferably have a free isocyanate content which facilitates acceptable strength in the compositions prepared, preferably after 60 minutes. For one-part moisture curable systems, the isocyanate content in the isocyanate functional components is preferably in the range of about 0.1 percent to about 10 percent, more preferably in the range of about 0.5 percent to about 5.0 percent and most preferably in the range of about 0.8 percent to about 3.0 percent. In one part compositions, the free isocyanate content is preferably about 1.2 percent by weight or greater based on the weight of the isocyanate functional components, prepolymer, and more preferably about 1.4 percent by weight or greater, and most preferably about 1.6 percent by weight or greater, and preferably about 2.2 percent by weight or less, more preferably about 2.0 or less, even more preferably about 1.8 percent by weight or less. Above about 2.2 percent by weight, cured compositions prepared from the isocyanate functional components, prepolymer, may demonstrate lap shear strengths after 60 minutes which are too low for the intended use. Below about 1.2 percent by weight, the isocyanate functional components, prepolymer, viscosity is too high to handle and the working time is too short. As is well known to the expert in the art, the polydispersity by definition is 1.0 or greater. The isocyanate functional components preferably exhibit a polydispersity of about 2.5 or less, more preferably about 2.3 or less and most preferably about 2.1 or less. For two-part isocyanate based adhesive systems, the isocyanate content in the isocyanate functional components is preferably in the range of about 6 percent to about 35 percent by weight, more preferably about 8 percent to about 30 percent by weight and most preferably about 10 percent to about 25 percent by weight.

Preferably, the viscosity of the isocyanate functional components is about 200 Pa·s or less, and more preferably about 150 Pa·s or less, and most preferably about 120 Pa·s or less. Preferably, the viscosity of the isocyanate functional components is about 50 Pa·s or greater. The viscosity of the compositions can be adjusted with fillers. Below about 50 Pa·s a composition prepared from the isocyanate functional components may exhibit poor high speed tensile strength. Above about 150 Pa·s the isocyanate functional components, prepolymer, may be unstable and hard to pump. "Viscosity" as used herein is measured by the Brookfield Viscometer, Model DV-E with a RV spindle #5 at a speed of 5 revolutions per second and at a temperature of 23° C.

Preferably, the polyisocyanates for use in preparing the isocyanate functional components include any aliphatic, cycloaliphatic, araliphatic, heterocyclic or aromatic polyisocyanate, or mixtures thereof. Preferably, the polyisocyanates used have an average isocyanate functionality of about 2.0 or greater and an equivalent weight of about 80 or greater. Preferably, the isocyanate functionality of the polyisocyanate is about 2.0 or greater, more preferably about 2.2 or greater, and is most preferably about 2.4 or greater; and is preferably about 4.0 or less, more preferably about 3.5 or less, and most preferably about 3.0 or less. Higher functionality may also be used, but may cause excessive cross-linking, and result in a composition which is too viscous to handle and apply easily, and can cause the cured composition to be brittle. Preferably, the equivalent weight of the polyisocyanate is about 80 or greater, more preferably at about 110 or greater, and is most preferably about 120 or greater; and is preferably about 300 or less, more preferably about 250 or less, and most preferably about 200 or less.

Examples of preferable polyisocyanates include those disclosed by Wu, U.S. Pat. No. 6,512,033 at column 3, line 3 to line 49, incorporated herein by reference. More preferred isocyanates are aromatic isocyanates, alicyclic isocyanates and derivatives thereof. Preferably, the aromatic isocyanates have the isocyanate groups bonded directly to aromatic rings. Even more preferred polyisocyanates include diphenylmethane diisocyanate and polymeric derivatives thereof, isophorone diisocyanate, tetramethylxylene diisocyanate, 1,6-hexamethylene diisocyanate and polymeric derivatives thereof, bis(4-isocyanatocylohexyl)methane, and trimethyl hexamethylene diisocyanate. The most preferred isocyanate is diphenylmethane diisocyanate. The amount Of isocyanate containing compound used to prepare the isocyanate functional prepolymers is that amount that gives the desired properties, such as free isocyanate content and viscosities. Preferably, the isocyanates are used to prepare the isocyanate prepolymers in an amount of about 1.3 equivalents of isocyanate (NCO) per equivalent of active hydrogen or greater, more preferably about 1.4 equivalents of isocyanate or greater and most preferably about 1.5 equivalents of isocyanate or greater. Preferably, the polyisocyanates used to prepare the isocyanate functional prepolymers are used in an amount of about 2.0 equivalents of isocyanate per equivalent of active hydrogen or less, more preferably 1.8 equivalents of isocyanate or less and most preferably about 1.6 equivalents of isocyanate or less.

Preferably the isocyanate functional components, such as prepolymers, are the reaction product of one or more polyisocyanates and one or more isocyanate reactive compounds wherein an excess of polyisocyanate is present on an equivalents basis. Preferably the isocyanate functional components, prepolymers, are the reaction product of one or more polyisocyanates with one or more polyols, preferably a mixture of one or more polyether diols and/or one or more polyether triols wherein an excess of polyisocyanate is present on an equivalents basis. The diols and triols are generically referred to as polyols. Preferably, polyols useful in the preparation of the prepolymers include those disclosed in Wu, U.S. Pat. No. 6,512,033 at column 4, line 10 to line 64, incorporated herein by reference, for example, polyether polyols, polyester polyols, poly(alkylene carbonate)polyols, hydroxyl containing polythioethers and mixtures thereof. Preferred polyols are polyether polyols containing one or more alkylene oxide units in the backbone of the polyol. Preferred alkylene oxide units are ethylene oxide, propylene oxide, butylene oxide and mixtures thereof. The alkylene oxides can contain straight or branched chain alkylene units. Preferably, the polyol contains propylene oxide units, ethylene oxide units or mixtures thereof. Mixtures of alkylene oxide can be arranged randomly or in blocks. In some preferred embodiments, the polyol comprises propylene oxide chains with ethylene oxide chains capping the polyol. Preferably the polyols are a mixture of diols and triols. Preferably the ethylene oxide capped polypropylene oxides are hydrophobic, and preferably contain less than about 20 mole percent of ethylene oxide and more preferably less than 10 mole percent of ethylene oxide in the backbone. Preferably, the isocyanate-reactive compound has a functionality of about 1.8 or greater, more preferably about 1.9 or greater, and is most preferably about 1.95 or greater; and is preferably about 4.0 or less, more preferably about 3.5 or less, and is most preferably about 3.0 or less. Preferably, the equivalent weight of the isocyanate-reactive compound is about 200 or greater, more preferably about 500 or greater, and is more preferably about 1,000 or greater; and is preferably about 5,000 or less, more preferably about 3,000 or less, and is most preferably about 2,500 or less. The compositions may further comprise one or more prepolymers containing one or more organic based polymers dispersed therein. Preferably, the organic based polymer is included in the prepolymer by inclusion of a dispersion triol having dispersed therein particles of an organic based polymer, for example one or more of thermoplastic polymers, rubber-modified thermoplastic polymers or a polyureas dispersed in one or more triols. The preferable dispersion triols are disclosed in Zhou, U.S. Pat. No. 6,709,539 at column 4, line 13 to column 6, line 18, incorporated herein by reference. Preferably, the triols used to disperse the organic particles is one or more polyether triols as described herein. Preferably such dispersion triol based prepolymers are contained in the composition in an amount below about 5 percent by weight and greater than 0 if present.

The isocyanate reactive compounds are present in an amount sufficient to react with most of the isocyanate groups of the isocyanates leaving enough isocyanate groups to correspond with the desired isocyanate content of the prepolymer. Preferably, the containing active hydrogen groups are present in an amount of about 50 percent by weight or greater based on the prepolymer, more preferably about 65 percent by weight or greater and most preferably about 80 percent by weight or greater. Preferably, the containing active hydrogen groups are present in an amount of about 90 percent by weight or less based on the prepolymer and most preferably about 85 percent by weight or less.

The isocyanate functional components used in the invention may includes isocyanate functional components containing isocyanate moieties and alkoxy silane moieties. All of isocyanate functional components may contain alkoxysilane moieties or such isocyanate functional components may be blended with isocyanate functional components which do not have alkoxy silane moieties. The isocyanate functional components may contain sufficient alkoxy silane moieties to improve the adhesion to substrates, for instance glass and coated substrates. The alkoxy silane content in the isocyanate functional components is preferably about 0.2 percent by weight or greater, more preferably about 0.4 percent by weight or greater and most preferably about 0.8 percent by weight or greater. The alkoxy silane content in the isocyanate functional components is preferably about 6.0 percent by weight or less, more preferably about 5.0 percent by weight or less and most preferably about 4 percent by weight or less. Alkoxy silane content means the weight percentage of alkoxy silane moieties to the total weight of the prepolymer. Silanes having, active hydrogen atoms reactive with isocyanate moieties, can be reacted with the terminal isocyanate moieties of isocyanate functional prepolymesr. Such reaction products are disclosed in U.S. Pat. Nos. 4,374,237 and 4,345,053 relevant parts incorporated herein by reference. Silanes having reactive hydrogen moieties reactive with isocyanate moieties may be reacted into the backbone of the prepolymer by reacting such silane with the starting materials during the preparation of the prepolymer such process is disclosed in U.S. Pat. No. 4,625,012, relevant portions incorporated herein by reference.

The isocyanate functional components may be prepared by any suitable method, such as bulk polymerization and solution polymerization. The reaction to prepare the prepolymers is carried out under anhydrous conditions, preferably under an inert atmosphere such as a nitrogen blanket and to prevent crosslinking of the isocyanate groups by atmospheric moisture. The reaction is preferably carried out at a temperature from about 0° C. to about 150° C., more preferably from about 25° C. to about 90° C., until the residual isocyanate content determined by titration of a sample is very close to the desired value. The reactions to prepare the prepolymer may be carried out in the presence of urethane catalysts, for example: stannous salts of carboxylic acids, such as stannous octoate, stannous oleate, stannous acetate, and stannous laurate; dialkyltin dicarboxylates, such as dibutyltin dilaurate and dibutyltin diacetate; tertiary amines; and tin mercaptides, preferably staimous octoate. The amount of catalyst employed is generally from about 0.005 to about 5 parts by weight of the mixture catalyzed, depending on the nature of the isocyanate. Preferably, the reaction is carried out in admixture with a plasticizer.

The polymers containing a flexible backbone and silane moieties capable of silanol condensation comprise any polymer backbone which is flexible, elastomeric, and which contains moieties capable of silanol condensation. Preferred classes of polymers which contain flexible backbones are polyolefins, polysiloxanes, polyether polyols, polyureas and polyurethanes, and the like, with polyolefins, polyether polyols and polyurethane backbones more preferred, with polyolefins and polyether polyols most preferred. Silane moieties capable of silanol condensation include moieties which can undergo hydrolysis to form silanol groups, —SiOH, which can in the presence of a silanol condensation catalyst can condense and crosslink. Preferred hydrolyzable groups include hydrogen and halogen atoms, alkoxy, acyloxy, ketoximate, amino, amido, acid amido, amino-oxy, mercapto, and alkenyloxy groups. More preferred are hydrogen atoms, and alkoxy, acyloxy, ketoximate, amino, amido, amino-oxy, mercapto, and alkenyloxy groups. Alkoxy groups are more preferred with methoxy or ethoxy groups being most preferred. Preferred polymers containing a flexible backbone and silane moieties capable of silanol condensation are disclosed in Mahdi et al., U.S. Pat. No. 7,789,990 relevant parts incorporated herein by reference.

The one or more isocyanate functional components, one or more oligomers or prepolymers containing isocyanate functional groups and alkoxysilane groups or prepolymers having a flexible backbone and silane moieties capable of silanol condensation, are present in the composition of the invention in a sufficient amount such that the cured composition has sufficient strength for its designed purpose, in the case of adhesive systems such that the adhesive is capable of bonding substrates together and to provide the desired cohesive and adhesive strengths. Preferably, such components are present in an amount of about 20 percent by weight or greater based on the weight of the composition; more preferably about 30 percent by weight or greater and most preferably about 50 percent by weight or greater. Preferably, the polyurethane prepolymer is present in an amount of about 70 percent by weight or less based on the weight of the composition, more preferably about 60 percent by weight or less and most preferably about 55 percent by weight or less. Wherein such components (a) comprise one or more isocyanate functional components and one or more of an oligomer or prepolymer containing isocyanate functional groups and alkoxysilane groups, the one or more of an oligomer or prepolymer containing isocyanate functional groups and alkoxysilane groups are present in an amount of about 1 percent by weight or greater based on the weight of the composition, more preferably about 5 percent by weight or greater and more preferably about 10 percent by weight or greater. In such embodiment the one or more of an oligomer or prepolymer containing isocyanate functional groups and alkoxysilane groups are present in an amount of to less than 70 percent by weight, more preferably 50 percent by weight or less and most preferably about 20 percent by weight or less. In this embodiment the remainder of the prepolymer is one or more isocyanate functional components that do not contain alkoxy silane groups.

One-part polyisocyanate functional compositions and either or both of the resin part and the curative part for two-part isocyanate functional systems may contain plasticizers, fillers, pigments, stabilizers and other additives commonly present in curable polyurethane forming adhesives. By the addition of such materials, physical properties such as rheology, flow rates and the like can be modified. However, to prevent premature hydrolysis of the moisture sensitive groups of the isocyanate functional component, fillers should be thoroughly dried before admixture therewith.

The compositions preferably contain plasticizers, such as common plasticizers useful in polyurethane compositions. The plasticizers are present in an amount sufficient to disperse the isocyanate functional components, one or more oligomers or prepolymers containing isocyanate functional groups and alkoxysilane groups, prepolymers having a flexible backbone and silane moieties capable of silanol condensation or mixtures thereof in the final compositions. The plasticizers can be added to the composition either during preparation of the prepolymers, or during compounding of the composition. Exemplary include straight and branched alkylphthalates, such as diisononyl phthalate, dioctyl phthalate and dibutyl phthalate, a partially hydrogenated terpenes, such as those commercially available as "HB-40", trioctyl phosphate, alkylsulfonic acid esters of phenol (Mesamoll, Bayer), toluene-sulfamide, adipic acid esters, castor oil, xylene, 1-methyl-2-pyrrolidinone and toluene. The plasticizers may branched plasticizers, such as branched chain alkyl phthalates (di-isononyl phthalates (available under the Trademark PLATINOL N from BASF)). The amount of plasticizer used is that amount sufficient to give the desired rheological properties and disperse the components in the composition of the invention. Preferably, the plasticizer is present in about 1 percent by weight or greater of the composition, more preferably about 5 percent by weight or greater and most preferably about 10 percent by weight or greater. Preferably, the plasticizer is present in about 50 percent by weight or less of the composition and more preferably about 40 percent by weight or less.

The composition may comprise components to control the rheology, viscosity, pumpability and the sag characteristics of the composition, such as one or more fillers, one or more isocyanate functional polyester based prepolymers or mixture thereofs. These materials are added in a sufficient amount such that the composition exhibits the desired rheology, viscosity and the sag characteristics. In some embodiments the compositions of the invention are self-leveling. Self-leveling means the material will be pulled by gravity during and immediately following the application fill gaps prior to curing. Any rheology control component that provides acceptable rheology for the desired use may be utilized, for example coated and uncoated calcium carbonate, fumed silica, polyvinylchloride powder (which may be swollen in hydrocarbon solvents, such as aromatic hydrocarbons), polyureas, polyamide waxes, castor oil derivatives, organoclays, and the like. The rheology control additives are added in a sufficient amount to control the flow of the material during and after application, the amount of control varies by application, it can range from self-leveling to maintaining the shape of an extruded shape, such as a triangular bead (25 mm tall, 10 mm wide), without movement on vertical surface after application, while maintaining a low enough viscosity to be applied. Preferably the rheology control additives are present in an amount of about 0.5 or greater based on the weight of the compositions, more preferably about 1.0 by weight or greater and most preferably about 2.0 by weight or greater. Preferably these components are added such that the composition exhibits a press flow viscosity of about 8 grams per minute or higher, more preferably about 12 grams per minute or higher and most preferably about 16 grams per minute or higher to allow for application with a manual dispensing gun.

One or more types of fillers may be utilized in the composition for a variety of reasons such as to reinforce the composition, adjust viscosity and rheology, render the composition hand-gun applicability and strike a balance between cost and the desired properties of the composition and parts thereof. Exemplary classes of fillers include reinforcing fillers, clays, non-pigmented fillers, thixotropes and combinations thereof.

One group of fillers that impart a balance of cost and viscosity to each part, and hand gun applicable, are preferably non-pigmented fillers, and are used in a sufficient amount to impart such properties to the composition. Exemplary fillers include talc, calcium carbonates, and kaolin, with calcium carbonate or kaolin more preferred. Calcium carbonates include standard calcium carbonates (untreated) and calcium carbonates modified by treatment with other chemicals, such as organic acids or esters of organic acids (stearic acid). Kaolin (Kaolinite) comprises compounds represented by the chemical formula $Al_2Si_2O_5(OH)_4$, Preferably, the non pigmented filler is present in an amount of about 0 percent by weight or greater, even more preferably about 3 percent by weight and most preferably about 5 percent by weight or greater. Preferably, the non pigmented filler is present in an amount of about 32 percent by weight or less and most preferably about 25 percent by weight or less.

The composition may comprise a reinforcing filler present to improve the strength and rheology of the composition, which preferably comprises one or more forms of carbon black or titanium dioxide. The reinforcing filler is present in a sufficient amount to reinforce the composition and to improve the rheology of the composition. Preferably, the reinforcing filler is present in an amount such that the parts of the composition are nonconductive. Nonconductivity is generally understood to mean an impedance of the composition of at least $10^{10}$ Ohm-cm. When carbon black is used as the reinforcing filler, the carbon black used may be a standard carbon black. Standard carbon black is carbon black which is not specifically surface treated or oxidized to render it nonconductive. One or more nonconductive carbon blacks may be used in conjunction with the standard carbon black. The amount of standard carbon black in the composition is that amount which provides the desired color, viscosity, sag resistance and strength. If nonconductivity of the composition is desired, standard carbon black may be utilized at a level at which the composition is nonconductive. The non-conductive carbon blacks may be high surface area carbon blacks, which exhibits an oil absorption of about 110 cc/100 g or greater and preferably about 115 cc/100 g or greater and/or an iodine number of about 130 mg/g or greater and preferably about 150 mg/g or greater. Preferred non-conductive carbon blacks include ELFTEX™57100, MONARCH RAVEN™ 1040 and RAVEN™ 1060 carbon blacks. Standard carbon blacks are well known in the art and include RAVEN™ 790, RAVEN™ 450, RAVEN™ 500, RAVEN™ 430, RAVEN™ 420 and RAVEN™ 410 carbon blacks available from Colombian and CSX™ carbon blacks available from Cabot, and PRINTEX™30 carbon black available from Degussa. The reinforcing filler is preferably present in the composition, based on the weight of the composition, in an amount of about 0 percent by weight or greater, more preferably about 10 percent by weight or greater and most preferably about 14 percent by weight or greater. The reinforcing filler is preferably present the composition, based on the weight of the composition, in an amount of about 20 percent by weight or less, more preferably about 18 percent by weight or less, and most preferably about 16 percent by weight or less. If a non-conductive composition is desired the concentration of conductive carbon black is preferably below about 18 percent by weight in the overall composition The composition may comprise one or more pigments or dyes present to provide a desired color or opacity to the composition. Preferably, the pigments or dyes are durable, meaning that they have good outdoor durability and resist fading upon exposure to sun and the elements do not interfere in bonding of the composition to substrates. Pigments or dyes useful may be organic or inorganic. Preferable inorganic pigments include black iron oxides, zinc oxide, cerium oxide, and titania (TiO 2). Preferable organic pigments include carbon black, phthalocyanines, anthraquinones, perylenes, carbazoles, monoazo- and disazobenzimidazolones, isoindolinones, monoazonaphthols, di-arylidepyrazolones, rhodamines, indigoids, quinacridones, diazo-pyranthrones, dinitranilines, pyrazolones, dianisidines, pyranthrones, tetrachloroisoindolinones, dioxazines, monoazo acrylides, anthrapyrimidines and mixtures thereof. Commercial pigments which are useful in the compositions of the invention are disclosed in U.S. Patent Application 2002/0086914 relevant portions incorporated herein by reference. The pigments or dyes are used in an amount sufficient to give the desired color and level of opacity. Preferably, the pigment is non-black and/or non-reinforcing. En some preferred embodiments, the pigment is a white pigment such as titanium dioxide. Preferably the pigment or dye is present in an amount of about 0.01 part by weight or greater based on the weight of the composition, more preferably about 0.1 percent by weight or greater, even more preferably about 0.5 percent by weight or greater, more preferably about 1.0 percent by weight or greater and most preferably about 8 percent by weight or greater. Preferably, the amount of pigment useful is about 25 percent by weight or less based on the weight of the composition and most preferably about 20 percent by weight or less.

Clays may be added for the purpose of improving the cost effectiveness, viscosity and nonconductive nature of the compositions. Preferred clays include kaolin, surface treated kaolin, calcined kaolin, aluminum silicates and surface treated anhydrous aluminum silicates. The clays can be used in any form which facilitates formulation of a composition having the desired properties, preferably in the form of pulverized powder, spray-dried beads or finely ground particles. Clays may be used in an amount of about 0 percent by weight or greater of the composition, more preferably about 10 percent by weight or greater and even more preferably about 16 percent by weight or greater. The clays may be used in an amount of about 30 percent by weight or less of the composition and more preferably about 23 percent by weight or less.

The composition may further comprise a thixotrope (rheological additive) which are well known to those skilled in the art and include fumed silica and the like organically modified fumed silicas. The thixotrope may be added to the composition in a sufficient amount to give the desired rheological properties. The thixotrope may be present in an amount of about 0 percent by weight or greater based on the weight of the composition, preferably about 0.5 percent by weight or greater. The thixotrope may be present in an amount of about 3 percent by weight or less based on the weight of the composition and more preferably about 2 percent by weight or less.

The compositions contain an alicyclic hydroxylamine, a dihydrocarbyl hydroxyl amine; or nitrile oxide (nitroxyl) thereof, in an amount of such that the durability and/or ultraviolet stability of the compositions is enhanced. Durability as used herein refers to preventing degradation of the cured compositions. In practical terms this means that the cured compositions retain their strength for the life of the product, or a significant portion of the life of the product. Accelerated aging tests can be performed to predict the durability of the composition. Exposing the cured composition to elevated temperatures, preferably about 90° C., more preferably about 100° C. and most preferably about 110° C., for several days, preferably at least 30 days and more preferably about 45 days and then performing quick knife testing on the cured samples provides good prediction on the long term stability of the cured composition. The desired outcome of the quick knife adhesion test is 100 percent cohesive failure, meaning the adhesive bond is stronger than the composition. In a preferred embodiment, the cured adhesive exhibits 100 percent cohesive failure in the quick knife adhesion test after exposure to 100° C. for 30 days and more preferably after exposure to 110° C. for 30 days.

Dihydrocarbyl hydroxyl amines, alicyclic hydroxyl amines and nitrile oxides thereof, useful herein include any such compounds which when included in the compositions of this invention improve the durability of the compositions as described herein. Alicyclic hydroxyl amine means a nitrogen containing aliphatic heterocycle wherein the nitrogen atom has a hydroxyl moiety bound thereto. The hydrocarbyl groups on the dihydrocarbyl hydroxyl amine and the alicyclic hydroxyl amines can be substituted with any substituent which does not significantly impact the performance of these additives in the compositions, preferably hydroxyl, alkyl groups, ethers, tertiary amines and sulfides, and the like, more preferably hydroxyl and alkyl groups, and even more preferably hydroxyl and methyl groups. Preferred dihydrocarbyl hydroxyl amines and alicyclic hydroxyl amines correspond to the formula $(R^1)_2N$—OH wherein $R^1$ is independently in each occurrence a hyrocarbyl moiety or the two $R^1$ may combine to form a cyclic ring, wherein the hydrocarbyl groups or cyclic ring may be substituted with one or more substituents which do not interfere with the function of the compounds in this invention. Preferred substituents are disclosed hereinbefore.

Nitrile oxides (Nitroxyl) are compounds having the moiety —NO. Nitrile oxides may be prepared from the moiety —NOH utilizing known processes. The radical formed (—NO.) is stable under ambient conditions. In one embodiment, the nitroxyl or nitrile oxides are illustrated by the formula $(R^1)_2N$—O. wherein $R^1$ is described above. Preferably $R^1$ is independently in each occurrence a $C_{2-30}$ alkyl, alkaryl or aryl moiety or two of $R^1$ form a $C_{2-30}$ cycloalkyl moiety wherein such moieties may contain one or more heteroatoms and/or be substituted with one or more substituents which do not interfere with the function of the compounds in this invention; more preferably a $C_{10-20}$ alkyl, alkaryl or aryl moiety and two $R^1$ form a $C_{2-7}$ cycloalkyl group optionally containing heteroatoms and/or substituents; with $C_{10-20}$ alkyl moieties being even more preferred. Heteroatoms as used herein are preferably N, O or S, with N and O preferred and N most preferred. In a preferred embodiment two of $R^1$ may from a piperidine ring. Preferred substituents are described above. Among preferred dihydrocarbyl hydroxyl amines are hydroxylamine freebase from BASF, hydroxylamine derivatives from Mitsui Chemicals America, Inc., N-hydroxyl bis (N-benzyl)amine available as BNX 2000 from Mayzo Inc. and Irgastab FS Products from Ciba Specialty Chemicals which contains oxidized bis(hydrogenate tallow alkyl)amine, also described as bis(N-dodecyl)N-hydroxyl amine and XENOXYL™ 4-hydroxy-2,2,6,6-tetramethyl piperdinyl oxide available from Avecia, Inc. and having the structure

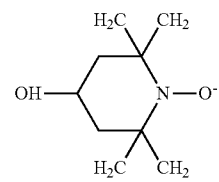

The hydroxyl amine version of this compound corresponds to the formula

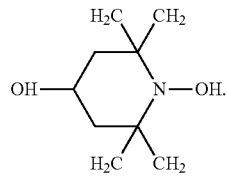

This compound is 1,4-dihydroxy-2,2,6,6-tetramethylpiperidine. Dihydrocarbyl hydroxyl amines, alicyclic hydroxyl amines or nitrile oxides thereof are utilized in an amount to enhance the durability and/or ultraviolet stability of the compositions. Preferably the hydroxyl amines or nitrile oxides thereof are used in an amount of about 0.01 percent or greater based on the weight of the compositions and more preferably about 0.1 percent by weight or greater. Preferably the hydroxyl amines or nitrite oxides thereof are used in an amount of about 2 weight percent or less based on the weight of the composition of the invention and more preferably about 1 weight percent or less. Nitrite oxides are preferred over hydroxyl amines.

The composition may further comprise one or more isocyanate functional prepolymers containing one or more polyester based polyols which are solid at ambient temperature, about 23° C. The polyester based polyols have melting points such that the prepolymer provides sufficient green strength to prevent the substrates from moving in relation to one another due to gravitational forces at ambient temperatures. Preferably, the polyester Polyols have melting points of about 40° C. or greater, even more preferably about 45° C. or greater and most preferably about 50° C. or greater. Preferably, the polyester polyols exhibit melting points of about 85° C. or less, even more preferably about 70° C. or less and most preferably about 60° C. or less. Preferably, the polyester polyol based isocyanate prepolymer is present in the composition in sufficient amount to provide green strength and rheology to the composition. If the amount is too high, the composition is not hand gun applicable at ambient temperature. Preferably, the polyester polyol based isocyanate prepolymer is present in the composition in an amount of about 0 percent by weight or greater based on the weight of the composition, more preferably about 1 percent by weight or greater and most preferably about 2 percent by weight or greater. Preferably, the polyester polyol based isocyanate prepolymer is present in the adhesive composition in an amount of about 10 percent by weight or less, even more preferably about 5 percent by weight or less and most preferably about 3 percent by weight or less.

The composition may further comprise a polyfunctional isocyanate for the purpose of improving the modulus of the composition in the cured form. Polyfunctional as used in the context of the isocyanates refers to isocyanates having a functionality of 3 or greater. The polyisocyanates can be any monomeric, oligomeric or polymeric isocyanates having a nominal functionality of about 3 or greater, more preferably about 3.2 or greater. Preferably, the polyfunctional isocyanates have a nominal functionality of about 5 or less, even more preferably about 4.5 or less and most preferably about 4.2 or less. The polyfunctional isocyanates can be any isocyanates which are reactive with the isocyanate functional component and which improve the modulus of the cured composition. The polyisocyanates can be monomeric; trimeric isocyanurates or biurets of monomeric isocyanates; oligomeric or polymeric, the reaction product of several units of one or more monomeric isocyanates. Examples of preferred polyfunctional isocyanates include trimers of hexamethylene diisocyanate, such as those available from Bayer under the trademark and designation DESMODUR N3300, DESMODUR N-100, and polymeric isocyanates such as polymeric MDI (methylene diphenyl diisocyanates) such as those marketed by The Dow Chemical Company under the trademark of PAPI, including PAPI 20 and PAPI 27 polymeric isocyanates. The polyfunctional isocyanates are present in a sufficient amount to impact the modulus of the cured compositions of the invention. If too much is used, the cure rate of the composition is unacceptably slowed down. If too little is used, the desired modulus levels are not achieved. The polyfunctional isocyanate is preferably present in an amount of about 0.5 percent by weight or greater based on the weight of the adhesive composition, more preferably about 1.0 percent by weight or greater and most preferably about 1.4 percent by weight or greater. The polyfunctional isocyanate is preferably present in an amount of about 8 percent by weight or less, based on the weight of the adhesive composition, more preferably about 5 percent by weight or less and most preferably about 3 percent by weight or less.

The compositions also contain one or more catalysts known to the skilled artisan which catalyze the reaction of isocyanate moieties with water or an isocyanate reactive moiety containing compound or silanol condensation. Where both isocyanate moieties and moieties capable of silanol condensation are present in the compositions both types of catalysts may be present or a catalyst which catalyzes both reactions may be utilized. Among preferred catalysts which catalyze the reaction of isocyanate moieties with water or an isocyanate reactive moiety containing compound are organotin compounds, metal alkanoates, and tertiary amines. Mixtures of classes of catalysts may be used. A mixture of a tertiary amine and a metal alkanoate or organotin compound is preferred, and more preferably tertiary amines, such as dimorpholino diethyl ether, and a metal alkanoate, such as bismuth octoate. Exemplary organotin compounds include alkyl tin oxides, stannous alkanoates, dialkyl tin carboxylates and tin mercaptides. Stannous alkanoates include stannous octoate. Alkyl tin oxides include dialkyl tin oxides; such as dibutyl tin oxide and its derivatives. The organotin catalyst is preferably a dialkyltin dicarboxylate or a dialkyltin dimercaptide. The preferred dialkyl dicarboxylates include 1,1-dimethyltin dilaurate, 1,1-dibutyltin diacetate and 1,1-dimethyl dimaleate. Preferred metal alkanoates include bismuth octoate or bismuth neodecanoate. The organo tin or metal alkanoate catalyst is present in an amount of about 60 parts per million or greater based on the weight of the composition, more preferably 120 parts by million or greater. The organo tin or metal alkanoates catalyst is present in an amount of about 1.0 percent or less based on the weight of the composition, more preferably 0.5 percent by weight or less and most preferably 0.1 percent by weight or less.

Exemplary tertiary amine catalysts include dimorpholinodialkyl ether, a di((dialkylmorpholino)alkyl)ether, bis-(2-dimethylaminoethyl)ether, triethylene diamine, pentamethyldiethylene triamine, N,N-dimethylcyclohexylamine, N,N-dimethyl piperazine 4-methoxyethyl morpholine, N-methylmorpholine, N-ethyl morpholine, diazabicyclo compounds and mixtures thereof. A preferred dimorpholinodialkyl ether is dimorpholinodiethyl ether. A preferred di-((dialkylmorpholino)alkyl)ether is (di-(2-(3,5-dimethylmorpholino)ethyl)-ether). Diazabicyclo compounds are compounds which have diazobicyclo structures. Preferred diazabicyclo hydrocarbons include diazabicycloalkanes, diazabicyclo alkene salts and mixtures thereof. Preferred diazabicycloalkanes include diazabicyclooctane, available from Air Products under the trademark and designations, DABCO, DABCO WT, DABCO DC 1, DABCO DC 2, and DABCO DC 21. Preferred diazabicycloalkene salts include diazabicycloundecene in the phenolate, ethylhexoate, oleate and formate salt forms, available from Air Products under the trademark and designations, POLYCAT SA 1, POLYCAT SA 1/10, POLYCAT SA 102 and POLYCAT SA 610. In some preferred embodiments, one or more diazabicyclo compounds and one or more organometallic and/or other tertiary amine catalysts are present in the composition. Tertiary amines are preferably employed in an amount, based on the weight of the composition of about 0.01 percent by weight or greater, more preferably about 0.05 percent by weight or greater, even more preferably about 0.1 percent by weight or greater and most preferably about 0.2 percent by weight or greater and about 2.0 percent by weight or less, more preferably about 1.75 percent by weight or less, even more preferably about 1.0 percent by weight or less and most preferably about 0.4 percent by weight or less.

The composition may further comprise one or more catalysts well-known in the art which catalyze the silanol condensation reaction for example tin compounds such as, dialkyltin (IV) salts of organic carboxylic acids, such as dibutyltin diacetate, dimethyl tin dilaurate, dibutyltin dilaurate, dibutyltin maleate or dioctyltin diacetate; tin carboxylates, such as tin octylate or tin naphthenate; reaction products of dialkyltin oxides and phthalic acid esters or alkane diones; dialkyltin diacetyl acetonates, such as dibutyltin diacetylacetonate (also commonly referred to as dibutyltin acetylacetonate); dialkyltinoxides, such as dibutyltinoxide; tin(II) salts of organic carboxylic acids, such as tin(II) diacetate, tin(II) dioctanoate, tin(II) diethylhexanoate or tin(II) dilaurate; dialkyl tin (IV) dihalides, such as dimethyl tin dichloride; and stannous salts of carboxylic acids, such as stannous octoate, stannous oleate, stannous acetate, or stannous laurate. Silanol condensation catalysts may be used individually or in combinations of 2 or more. Preferred are the dialkyl tin dicarboxylates, dialkyl tin oxides, dialkyl bis(acetylacetonates), reaction products of dialkyltin oxide and phthalic acid esters or an alkane dione, dialkyltin halides and dialkyl tin oxides. More preferred catalysts are dibutyltin dilaurate, dimethyltin dilaurate, dibutyltin maleate, dibutyltin diacetate, tin octylate, tin naphthenate, reaction products of dibutyltin oxide and phthalic acid esters or pentanedione, dibutyl tin diacetylacetonate, dibutyltinoxide, dimethyl tin chloride and the like. The amount of catalyst used is that amount which facilitates the cure of the composition without causing degradation of the composition after cure. The amount of catalyst in the composition is preferably about 0.01 weight percent or greater, more preferably about 0.1 weight percent or greater, and most preferably about 0.2 weight percent or greater, and preferably about 5 weight percent or less, even more preferably about 1.0 weight percent or less and most preferably about 0.4 weight percent or less.

The composition may further comprise stabilizers, which function to protect the composition from moisture, thereby inhibiting advancement and preventing premature crosslinking of the isocyanates or silanol groups in the curable composition, such stabilizers include diethylmalonate, alkylphenol alkylates, paratoluene sulfonic isocyanates, benzoyl chloride, calcium oxide and orthoalkyl formates. Such stabilizers are preferably used in an amount of about 0.1 percent by weight or greater based on the total weight of the curable composition, preferably about 0.5 percent by weight or greater and more preferably about 0.8 percent by weight or greater. Such stabilizers are used in an amount of about 5.0 percent by weight or less based on the weight of the curable composition, more preferably about 2.0 percent by weight or less and most preferably about 1.4 percent by weight or less.

The composition may further comprise an adhesion promoter, such as those disclosed in Mahdi, U.S. Patent Publication 2002/0100550 paragraphs 0055 to 0065 and Hsieh, U.S. Pat. No. 6,015,475 column 5, line 27 to column 6, line 41 incorporated herein by reference. Preferred classes of adhesion promoters include silanes, titanates and zirconates and the like, preferably a silane in some form. Preferable methods of including silane functionality in the adhesive formulations are disclosed in Wu et al., U.S. Pat. No. 6,512,033 at column 5, line 38 to column 7, line 27; U.S. Pat. Nos. 5,623,044; 4,374,237; 4,345,053 and 4,625,012, relevant portions incorporated herein by reference. The silane may be blended with the composition, a silane, having active hydrogen moieties, can be reacted with a polyisocyanate to form an adduct which is blended with the composition, reacted with a polyurethane prepolymer Or reacted with a polyisocyanate and a compound having on average more than one moiety reactive with an isocyanate moiety to form a prepolymer with both isocyanate and silane moieties (alkoxysilane groups). Preferably the adduct is a reaction product of a secondary amino- or mercapto-alkoxy silane and a polyisocyanate, the adduct having an average of at least one silane group and at least one isocyanate group per molecule (hereinafter "adduct"). The adduct level in the compositions is preferably in the range of about 0.5 percent to about 20 percent, more preferably in the range of about 1.0 percent to about 10 percent and most preferably in the range of about 2.0 percent to about 7 percent. Preferably such silane is a mercapto-silane or an amino-silane and more preferably is a mercapto-trialkoxy-silane or an amino-trialkoxy silane, for example: N,N-bis[(3-triethoxysilyl)propyl]amine; N,N-bis[(3-tripropoxy-silyl)propyl]amine; N-(3-trimethoxysilyl)propyl-3-[N-(3-trimethoxysilyl)-propyl amino]propion-amide; N-(3-triethoxysilyl)propyl-3-[N-3-triethoxysilyl)-propyl-amino]propion amide; N-(3-trimethoxysilyl)propyl-3-[N-3-triethoxy silyl)-propylamino]propionamide; 3-trimeth-oxysilyl propyl 3-[N-(3-trimethoxysilyl)-propyl amino]-2-methyl propionate; 3-triethoxysilyl propyl 3-[N-(3-triethoxysilyl)-propylamino]-2-methyl propionate; 3-trimethoxysilylpropyl 3-[N-(3-triethoxy silyl)-propylamino]-2-methyl propionate; and the like. Preferably the organo functional silane is gamma-mercaptopropyl-trimethoxysilane (available as A189 from Union Carbide) or N,N'-bis((3-trimethoxy silyl)propyl)amine. The amount of adhesion promoter present is that amount which enhances the adhesion of the composition to the substrate surface. The amount of adhesion promoter present is preferably about 0.01 percent by weight or greater based on the weight of the composition and most preferably about 0.1 percent by weight or greater. The amount of adhesion promoter used is preferably about 10 percent by weight or less and most preferably about 2.0 percent by weight or less. The adhesion promoter can be located in either or both parts of a two part composition.

The composition may comprise a hydrophilic material that functions to draw atmospheric moisture into the composition, to enhance the cure speed of the formulation. Preferably, the hydrophilic material is a liquid, including pyrrolidones such as 1 methyl-2-pyrrolidone (or N-methyl pyrrolidone). The hydrophilic material is preferably present in an amount of about 0.1 parts by weight or greater and more preferably about 0.3 parts by weight or greater and preferably about 1.0 parts by weight or less and most preferably about 0.6 parts by weight or less.

The two part compositions may comprise a curing agent located in the second part, which is a compound that contains greater than one active hydrogen containing functional group, preferably hydroxyl or amine functional groups. The curing agents can be one or more chain extenders, crosslinking agents, polyols or polyamines. Polyols as described hereinbefore can be utilized as curing agents. One class of polyols or polyamines can be prepolymers as described hereinbefore prepared utilizing excess equivalents of active hydrogen functional groups such that the resulting prepolymers contain active hydrogen functional groups, preferably hydroxyl and or amino groups. The curing agent may comprise one or more low molecular weight compounds having two or more isocyanate reactive groups and a hydrocarbon backbone wherein the backbone may further comprise one or more heteroatoms. It is advantageous to use such low molecular weight compounds in two-part compositions. Such low molecular weight compounds may be compounds known in the art as chain extenders, difunctional compounds, or crosslinkers, having, on average, greater than two active hydrogen groups per compound. The heteroatoms in the backbone can be oxygen, sulfur, nitrogen or a mixture thereof, with oxygen, nitrogen or a mixture thereof more preferred and oxygen most preferred. Preferably, the molecular weight of the low molecular weight compound is about 250 or less, more preferably about 120 or less and more preferably about 100 or less. Preferably, the low molecular weight compound comprises one or more multifunctional alcohols, multifunctional alkanol amines, one or more adducts of multifunctional alcohol and an alkylene oxide, one or more adducts of a multifunctional alkanol amine and an alkylene oxide or a mixture thereof. Among preferred multifunctional alcohols and multifunctional alkanol amines are ethane diol, propane diol, butane diol, hexane diol, heptane diol, octane diol, glycerine, trimethylol propane, pentaerythritol, neopentyl glycol, ethanol amines (diethanol amine, triethanol amine) and propanol amines (diisopropanol amine, tri-isopropanol amine) and the like. The low molecular weight compound is used in a sufficient amount to obtain the desired G-Modulus (E-Modulus). In two-part compositions, the low molecular compound may be located in the resin side, the curative side or both, preferably the curative side. Preferably, the low molecular weight compound is present in composition in an amount of about 2 percent by weight or greater, more preferably about 2.5 percent by weight or greater and most preferably about 3.0 percent by weight or greater. Preferably, the low molecular weight compound is present in the composition in an amount of about 10 percent by weight or less, more preferably about 8 percent by weight or less and most preferably about 6 percent by weight or less. In a two-part composition, the curative part may further comprise polyoxyalkylene polyamine having 2 or greater amines per polyamine. Preferably, the polyoxyalkylene polyamine has 2 to 4 amines per polyamine and most preferably 2 to 3 amines per polyamine. Preferably, the polyoxyalkylene polyamine has a weight average molecular weight of about 200 or greater and most preferably about 400 or greater. Preferably, the polyoxyalkylene polyamine has a weight average molecular weight of about 5,000 or less and most preferably about 3,000 or less. Among preferred polyoxyalkylene polyamines are JEFFAMINE™ D-T-403 polypropylene oxide triamine having a molecular weight of about 400 and JEFFAMINE™ D-400 polypropylene oxide diamine having a molecular weight of about 400. The polyoxyalkylene polyamines are present in a sufficient amount to prevent the composition from sagging once mixed and applied. Preferably, the polyoxyalkylene polyamine is present in the curable composition in an amount of about 0.2 percent by weight or greater, more preferably about 0.3 percent by weight or greater and most preferably about 0.5 percent by weight or greater. Preferably, the polyoxyalkylene polyamine is present in the curable composition in an amount of about 6 percent by weight or less, more preferably about 4 percent by weight or less and most preferably about 2 percent by weight or less.

Other components well known to those skilled in the art may be used in curable compositions including ultraviolet stabilizers and antioxidants and the like. In compositions useful in preparing molded parts, the compositions may further comprise components commonly used in molding parts such as mold release agents, fillers, conductive components and the like. In compositions used to form foams, such compositions may further comprise ingredients commonly used in foam forming compositions, such as blowing agents, mold release agents, skin forming agents and the like.

The compositions may also contain other durability stabilizers known in the art, including alkyl substituted phenols, phosphites, sebacates and cinnamates and preferably organophosphites. The durability stbilizers are preferably present in a sufficient amount to enhance the durability of bond of the adhesive composition to the substrate surface. Exemplary phosphites are disclosed in Hsieh et al. U.S. Pat. No. 7,416, 599 column 10, line 47 to Column 11 line 25, incorporated herein by reference. Among preferred phosphites are poly (dipropyleneglycol)phenyl phosphite (available from Dover Chemical Corporation under the trademark and designation DOVERPHOS 12), tetrakis isodecyl 4,4'isopropylidene diphosphite (available from Dover Chemical Corporation under the trademark and designation DOVERPHOS 675), and phenyl diisodecyl phosphite (available from Dover Chemical Corporation under the trademark and designation DOVERPHOS 7). Preferably, the durability stabilizers are present in the composition in an amount of about 0.1 percent by weight or greater and more preferably about 0.2 percent by weight or greater based on the weight of the composition. Preferably the durability stabilizers are present in the composition in an amount of about 1.0 percent by weight or less and more preferably about 0.5 percent by weight or less based on the weight of the composition.

The compositions may further include a light stabilizer, which facilitates the system maintaining durable bond to the substrate for a significant portion of the life of the structure to which it is bonded. Preferred light stabilizers are hindered amine light stabilizers, such as disclosed in Hsieh et al. U.S. Pat. No. 7,416,599 column 11, line 31 to line 63, incorporated herein by reference. More preferred hindered light amine stabilizers include Tinuvin 1,2,3 bis-(1-octyloxy-2,2,6,6, tetramethyl-4-piperidinyl)sebacate and Tinuvin 765, bis(1,2,2, 6,6,-pentamethyl-4-piperidinyl)sebacate. A sufficient amount of light stabilizer to enhance the bond durability to the substrate may be used. Preferably, the light stabilizer is used in amount of about 0.1 percent by weight or greater based on the weight of the composition, more preferably 0.2 percent by weight or greater and most preferably about 0.3 percent by weight or. Preferably, the amount of light stabilizer present is about 3 weight percent or less based on the weight of the composition, more preferably about 2 weight percent or less and most preferably about 1 weight percent or less.

The composition may further comprise an ultraviolet light absorber which enhances the durability of the bond of the composition to a substrate, for example benzophenones and benzotriazoles and those disclosed in Hsieh et al. U.S. Pat. No. 7,416,599 column 11, line 64 to Column 12 line 29, incorporated herein by reference. More preferred UV light absorbers include Cyasorb UV-531 2-hydroxy-4-n-octoxy-benzophenone and Tinuvin 571 2-(2H-benzotriazol-2-yl)-6-dodecyl-4-methylphenol, branched and linear. The UV light absorber is used in sufficient amount to enhance the durability of the bond of the adhesive to the substrate. The UV absorber may be used in an amount of about 0.1 percent by weight or greater based on the weight of the composition, more preferably about 0.2 weight percent or greater and most preferably about 0.3 weight percent or greater. The UV light inhibitor may be used in amount of about 3 percent by weight or less based on the weight of the composition, more preferably about 2 percent by weight or less and most preferably about 1 percent by weight or less.

The composition may be formulated by blending the components together using means well known in the art, such as in a suitable mixer. The blending is preferably conducted in an inert atmosphere, such as nitrogen or argon, in the absence of oxygen and atmospheric moisture to prevent premature reaction. Plasticizers may be added to the reaction mixture to enhance mixing and handling. Alternatively, the plasticizers can be added during blending of all the components. The ingredients are blended for a sufficient time to prepare a well blended mixture, preferably from about 10 to about 60 minutes. Once the composition is formulated, it is packaged in a suitable container such that it is protected from atmospheric moisture and oxygen.

The compositions may be used to bond a variety of substrates together, such as porous and nonporous substrates. The compositions are applied to a substrate and the composition on the first substrate is thereafter contacted with a second substrate. The surfaces to which the composition may be applied may be cleaned activated and/or primed prior to application of the composition, see for example, U.S. Pat. Nos. 4,525,511; 3,707,521 and 3,779,794, relevant parts are incorporated herein by reference. The compositions are applied at temperature at which they can be pumped. The one part adhesive compositions cure in the presence of atmospheric moisture, which is sufficient to result in curing of the composition. Curing can be accelerated by the addition of additional water or by applying heat to the curing composition by means of convection heat, microwave heating and the like. Preferably, the compositions are formulated to provide an open time of at least about 3 minutes or greater more preferably about 5 minutes or greater. "Open time" is understood to mean the time after application of the composition to a first substrate until it starts to become a high viscous paste and is not subject to deformation during assembly to conform to the shape of the second substrate and to adhere to it.

The compositions may be used to bond glass or abrasion coated transparent plastic to other substrates such as metal or plastics, for example the first substrate is a window and the second substrate is a window frame of an automobile or a building. Preferably, the window is cleaned and may have a wipe or primer applied to the area to which the composition is to be bonded. The window flange may be primed with a paint primer. The composition is applied in a bead to the periphery of the window located such that it will contact the window flange when placed in the vehicle. The window with the composition located thereon is then placed into the flange with the composition located between the window and the flange. The bead of the composition is a continuous bead that functions to seal the junction between the window and the window flange. A continuous bead of the composition is a bead that is located such that the bead connects at each end to form a continuous seal between the window and the flange when contacted. Thereafter the composition is allowed to cure.

In use, the components of two-part compositions are blended as would normally be done when working with such materials. In two-part compositions, the volume ratio at which the two parts are combined is preferably a convenient whole number to facilitate application of the curable composition with conventional, commercially available dispensers including static and dynamic mixing. The blended polymerizable composition is extruded from the mixing chamber onto a substrate. When using electrically-driven equipment, dynamic mixing may be used Some common mix ratios are 1:1, 2:1, 4:1 and 10:1 and can also be odd ratios, preferably about 1:1.

Preferably, the mixed two-part compositions have a suitable viscosity to allow application without dripping. Preferably, the viscosities of the two individual components are of the same order of magnitude. Preferably, for compositions mixed utilizing static mixing, the components prior to cure have a viscosity of about 10 Pa·S (10,000 centipoises) or greater, more preferably about 20 Pa·S (20,000 centipoises) or greater and most preferably about 40 Pa·S (40,000 centipoises) or greater. Preferably, the two parts of the compositions have a viscosity prior to contacting of about 150 Pa·S (150,000 centipoises) or less, more preferably about 120 Pa·S (120,000 centipoises) or less and most preferably about 100 Pa·S (100,000 centipoises) or less. "Viscosities" as used in this passage are determined at a shear rate of 20 reciprocal second measured with a cone plate rheometer of 20 mm diameter and 4° angle. Higher viscosities require dynamic mixing. For lower viscosities, the components may require gelling agent known in the art to prevent sag of the uncured composition. Two-part adhesive compositions start to cure upon mixing the two parts. Curing can be accelerated by applying heat to the curing adhesive by means of induction heat, convection heat, microwave heating and the like.

The compositions can be applied to fill gaps in structures and allowed to cure to seal about gaps in structures such as buildings or in vehicles. The compositions can be applied as described hereinbefore. Preferably compositions used to seal gaps comprise the following components: prepolymers, fillers, pigments, plasticizers, rheology modifiers, adhesion promoters, stabilizers, solvent such as described herein. In buildings the compositions can be used to seal gaps in structures. In vehicles the compositions of the invention can be utilized to seal gaps or seams between pans that may allow water to get in automobiles, buses, trucks, trailers, rail cars and specialty vehicles having such a gap or seal, such as about windows, door frames, trim, between body panels between door parts, and the like.

ILLUSTRATIVE EMBODIMENTS OF THE INVENTION

The following examples are provided to illustrate the invention, but are not intended to limit the scope thereof. All parts and percentages are by weight unless otherwise indicated.

Preparation of Hydroxyl Amine Component

A composition is prepared by adding 5 parts of 1,4-dihydroxy-2,2,6,6-tetramethylpiperidine (4-hydroxy-TEMPO) to 100 parts of phthalate plasticizer and placing it in an oven at 70° C. overnight until the mixture appears to form a solution. The 4-hydroxy-TEMPO remains in solution after cooling to room temperature. It is stored at room temperature. A portion of the solution is incorporated into the composition containing the ingredients and amounts listed in the Table.

TABLE

| Component | Weight % | Amount (g) |
| --- | --- | --- |
| Prepolymer prepared from polyether diol, polyether triol and MDI | 35.6 | 569.6 |
| Reaction product of biuret of HDI and an aminosilane | 4.0 | 64 |
| P-toluenesulfonyl isocyanate | 0.3 | 4.8 |
| Ground calcium carbonate | 13.9 | 222.4 |
| Calcined aluminum silicate clay | 13.9 | 222.4 |
| Titanium dioxide | 6.9 | 110.4 |
| Diisononyl phthalate | 16.8 | 268.8 |

TABLE-continued

| Component | Weight % | Amount (g) |
|---|---|---|
| Solution of 5% percent 4 hydroxy TEMPO in Diisononyl phthalate | 4.1 | 65.6 |
| 2,2'-dimorpholino diethyl ether | 0.5 | 8 |
| Prepolymer of MDI and linear copolyester | 4.0 | 64 |
| Total | 100 | 1600 |

Examples 1 and 2

The composition is prepared by adding the first six ingredients to a double planetary Ross mixer. The mixture is mixed under vacuum for 10 minutes. The vacuum is released with nitrogen, the mixer is opened and scraped down. The mixture is mixed under vacuum for an additional 20 minutes. The plasticizer and 4-hydroxy TEMPO are added and the mixture is mixed for 20 minutes. 2,2'-dimorpholino diethyl ether and the prepolymer of MDI and linear copolyester are added and mixed under vacuum for 20 minutes. The mixture is removed from the mixer and packaged in an airtight moisture proof container.

Examples 3 and 4

Two comparative samples are prepared one with no stabilizers and a second with 2 weight percent of a combination of traditional stabilizers; 33% Tinuvin 765 (hindered amine light stabilizer), 34% Tinuvin 571 (UV absorber) and 33% Doverphos 4 (organophosphite).

Testing Procedure

Figure 2:
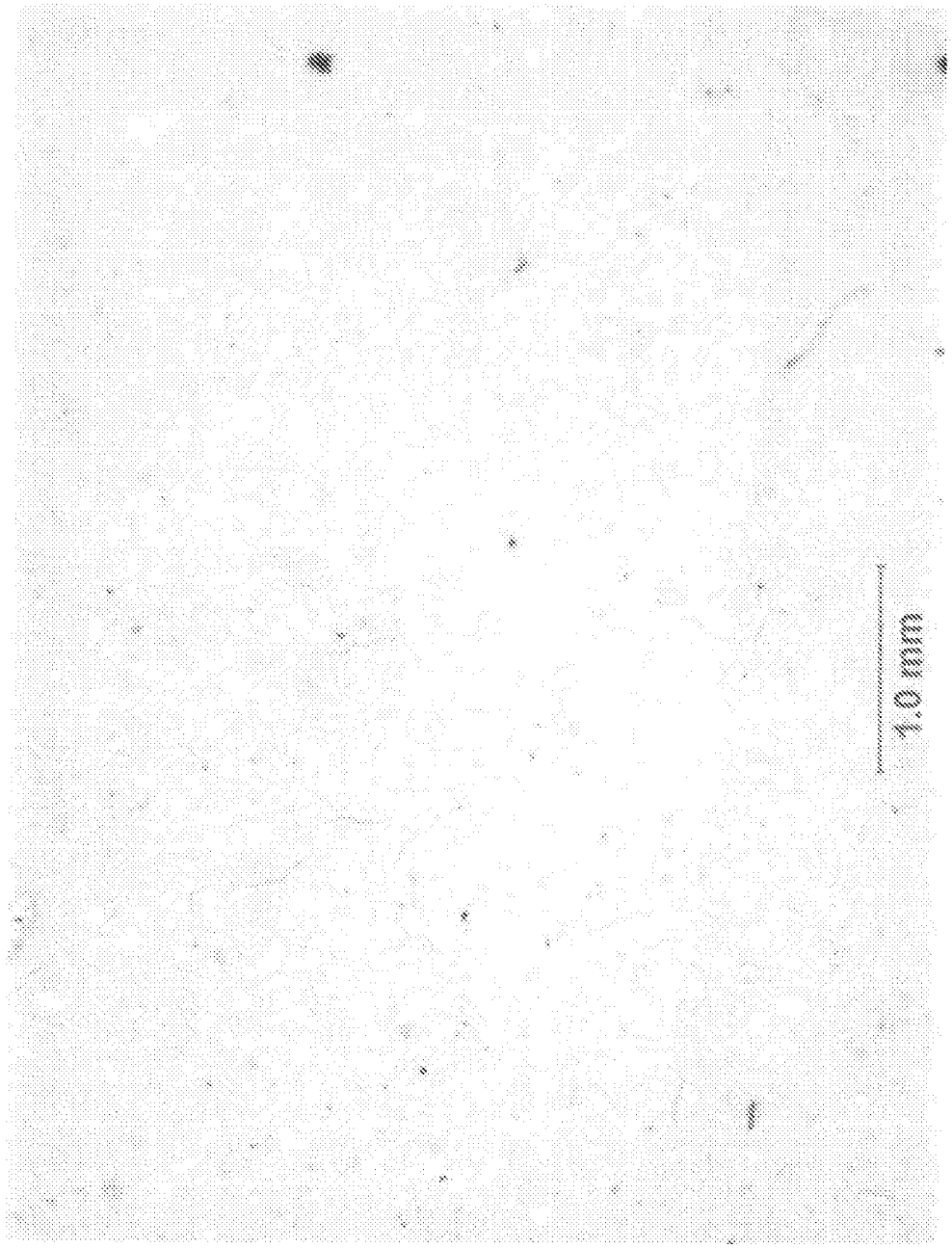
FIGS. 2 and 4 are micrographs of a composition of the invention coated on an e-coated panel after 1000 hours of Weather-O-Meter exposure.
Figure 3:
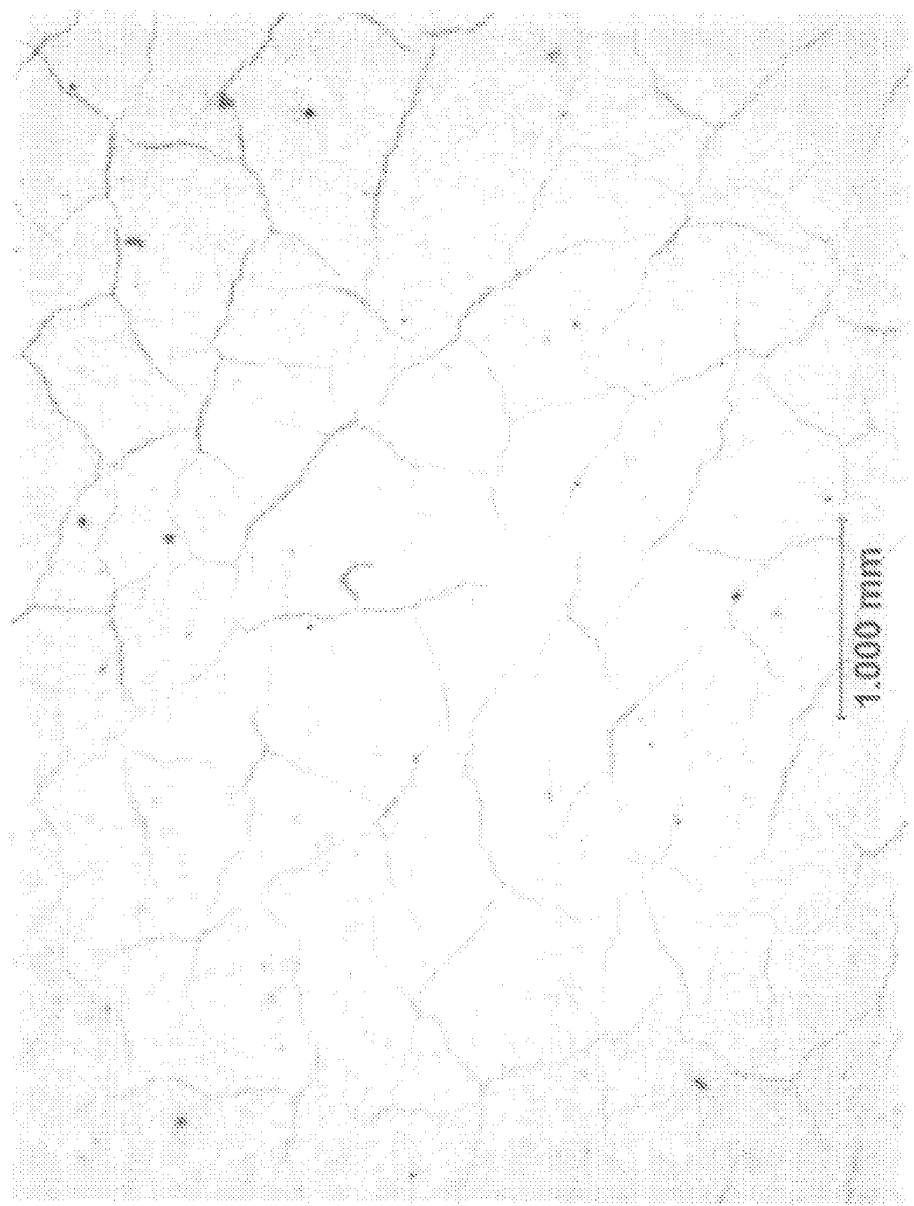
FIG. 3 is a micrograph of a composition with known stabilizers coated on an e-coated panel after 1000 hours of Weather-O-Meter exposure.
Figure 4:
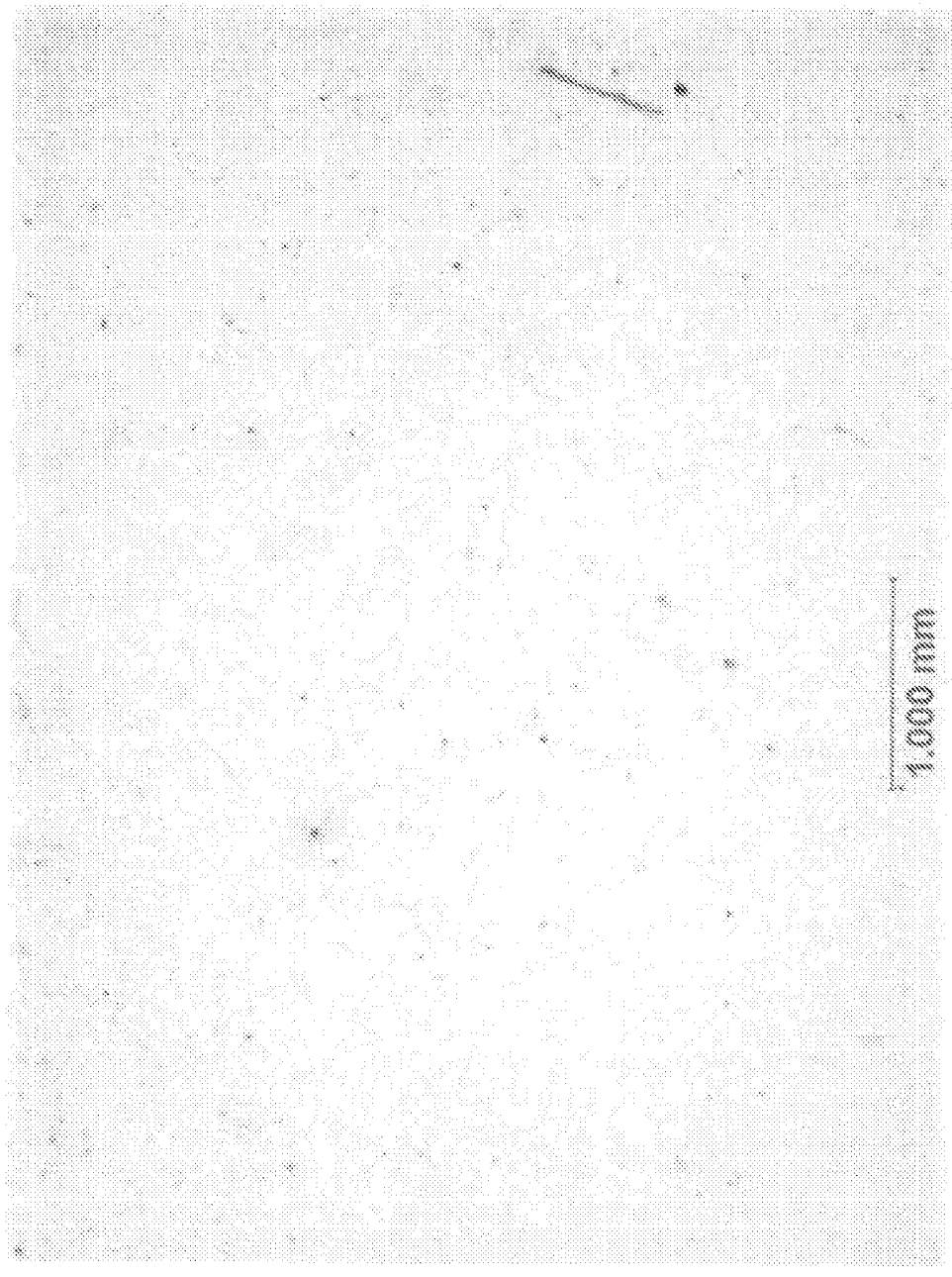
Figure 5:
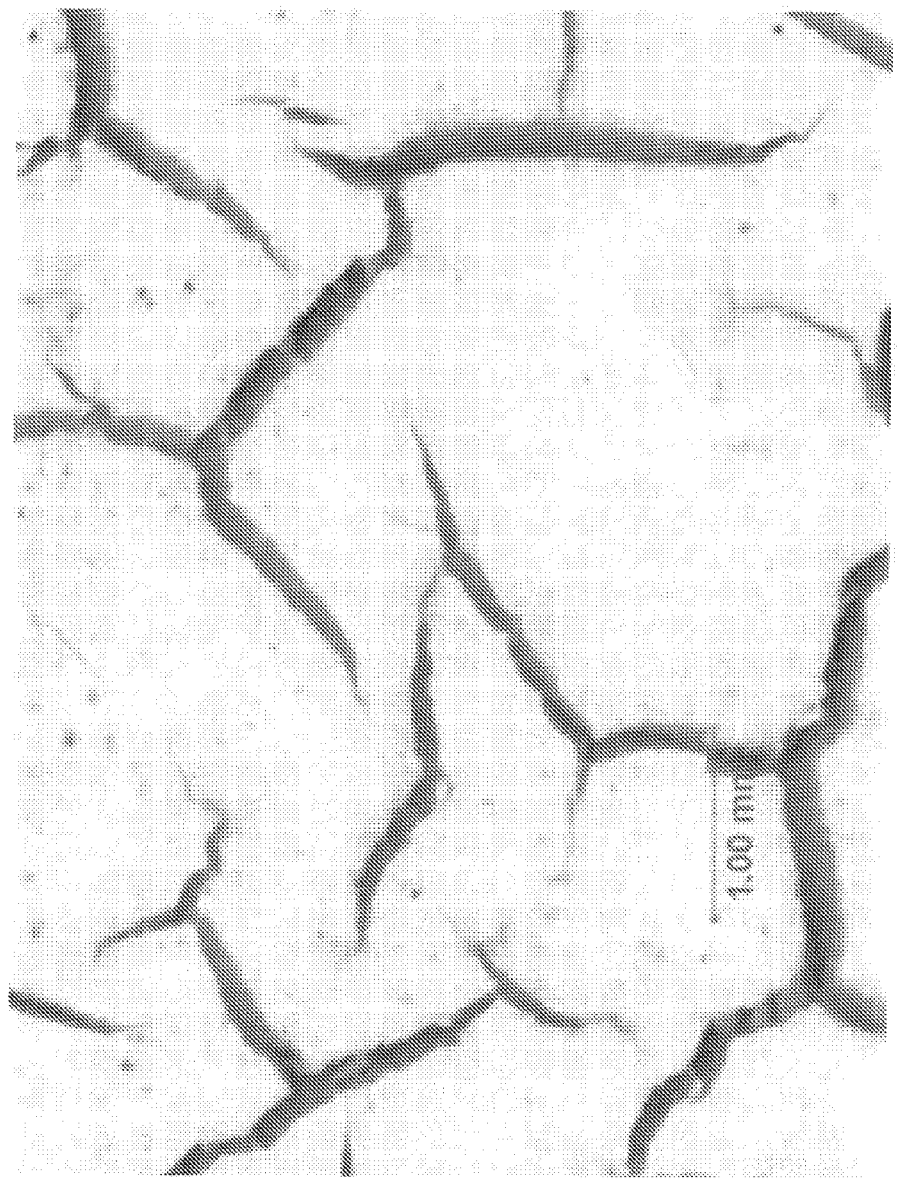
FIGS. 5 to 11 are micrographs of coatings based on Examples 5 to 11 after 1000 hours of exposure to the Weather-O-Meter.
Figure 6:
Figure 7:
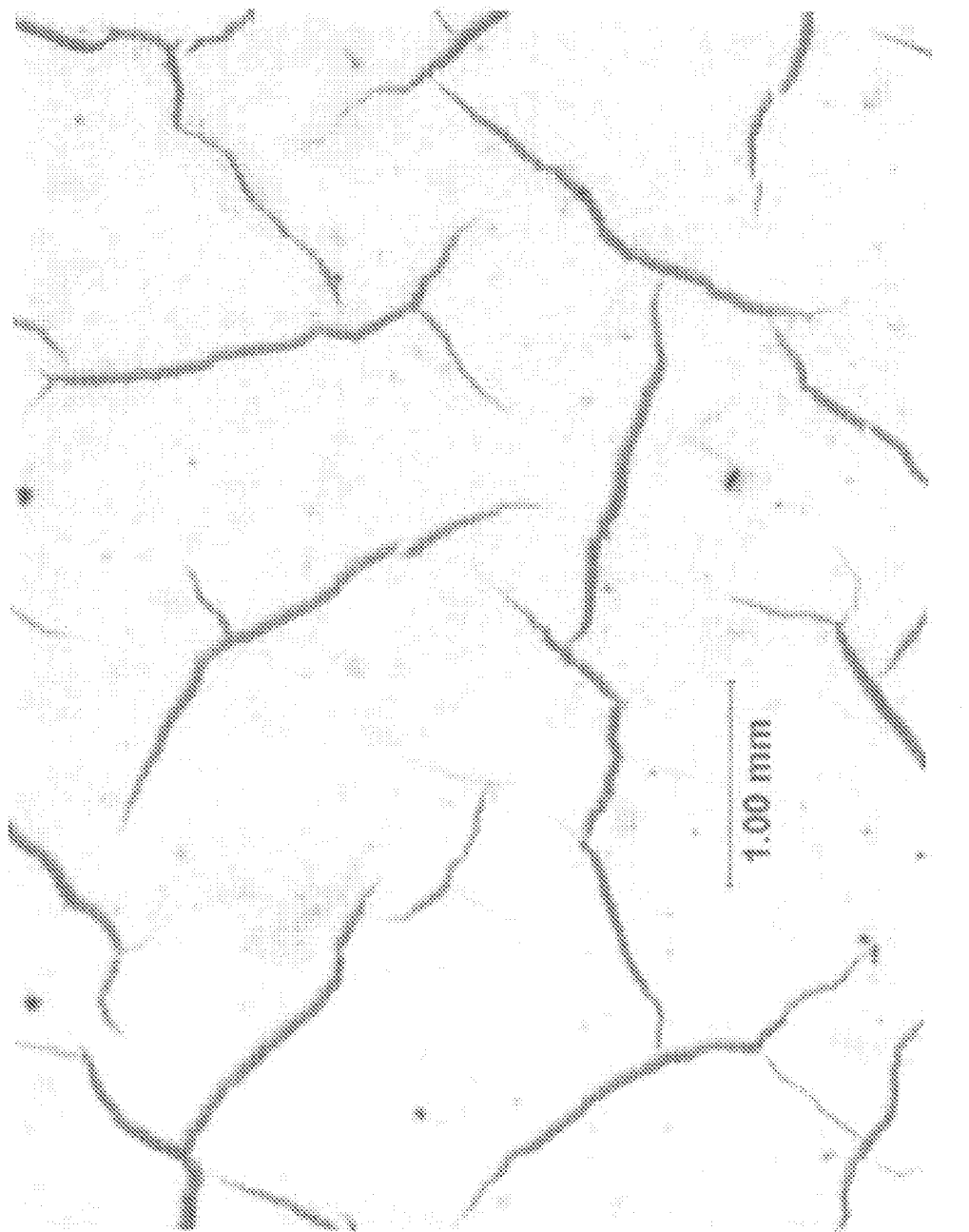
Figure 8:
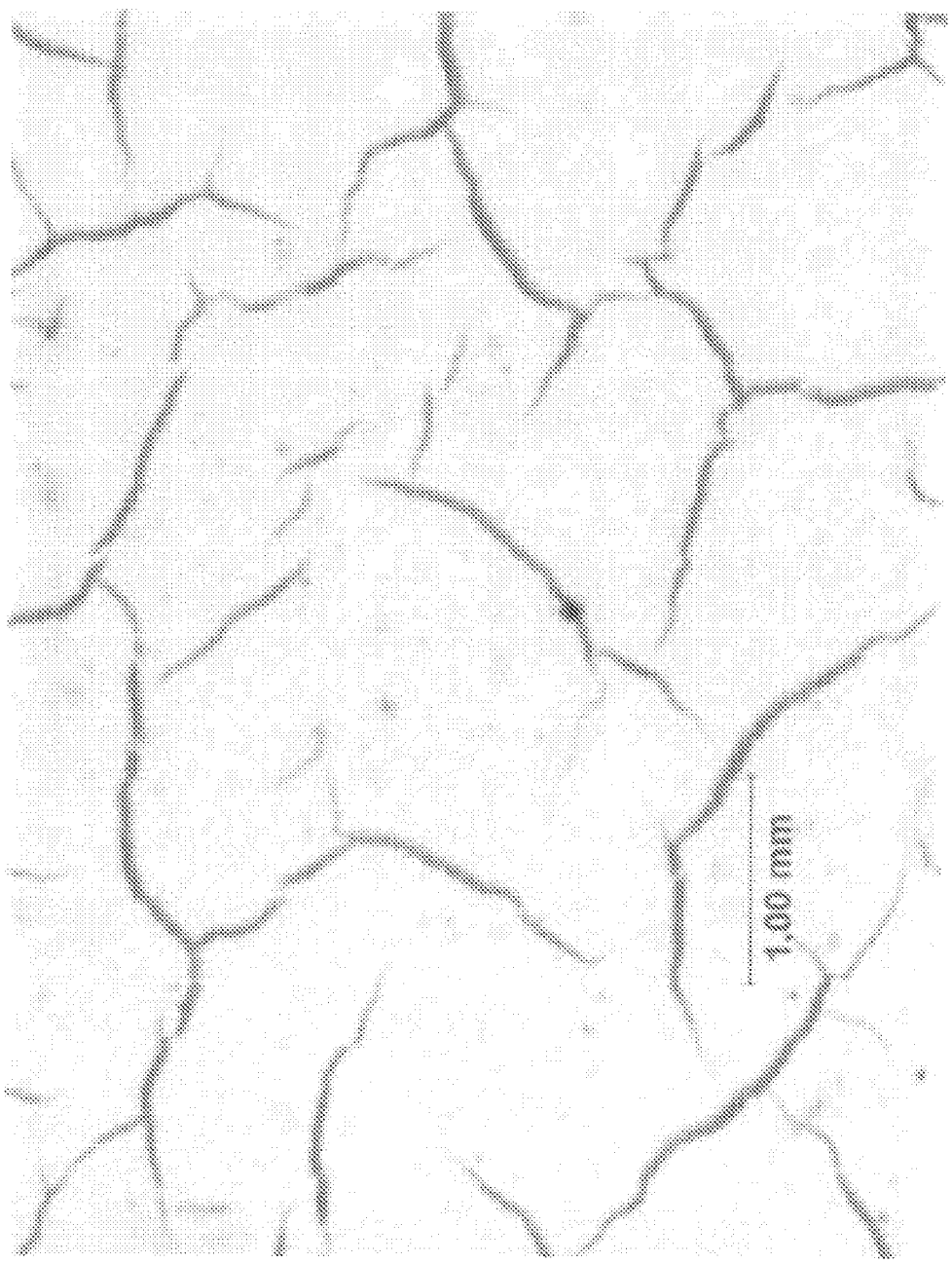
Figure 9:
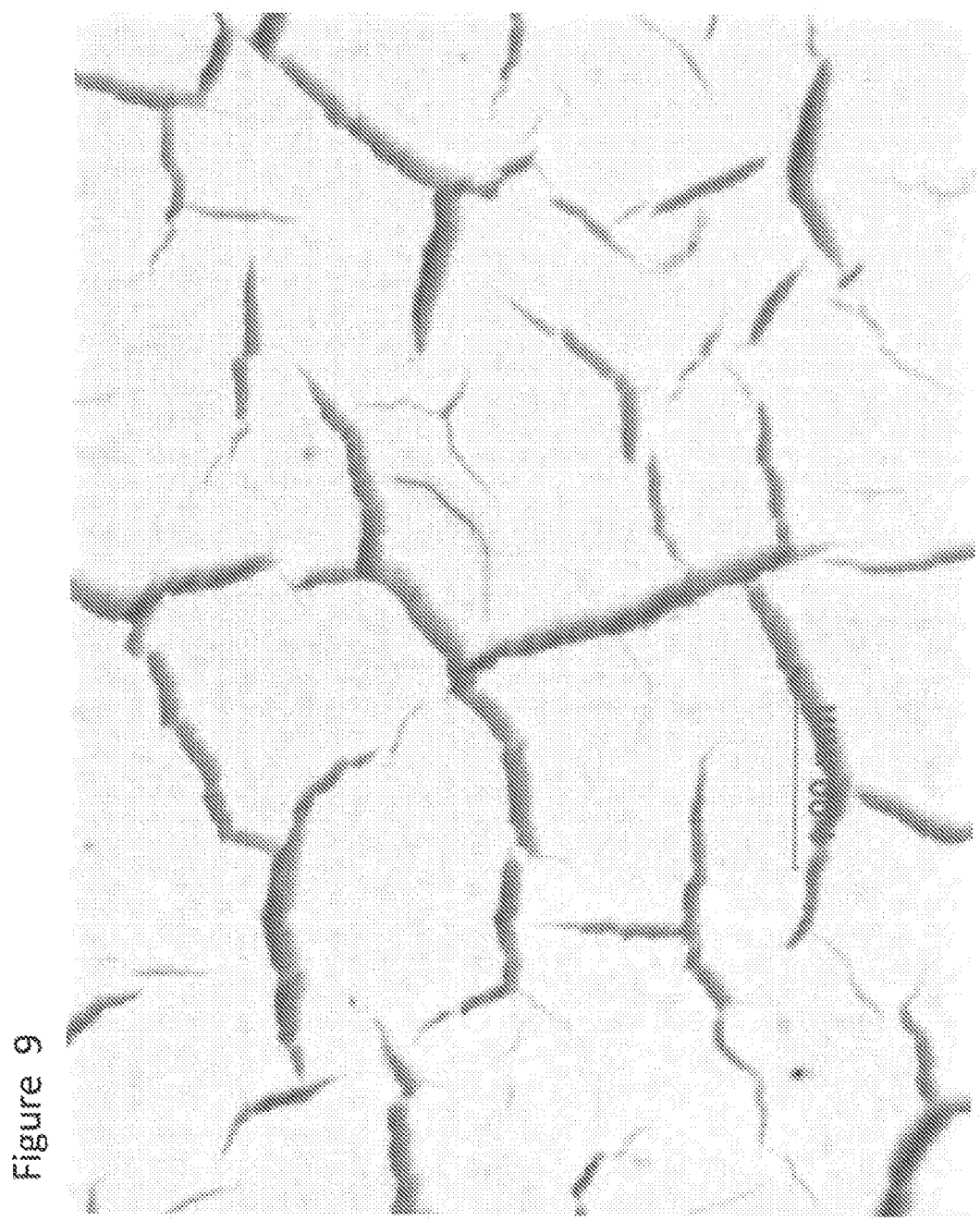
Figure 10:
Figure 11:
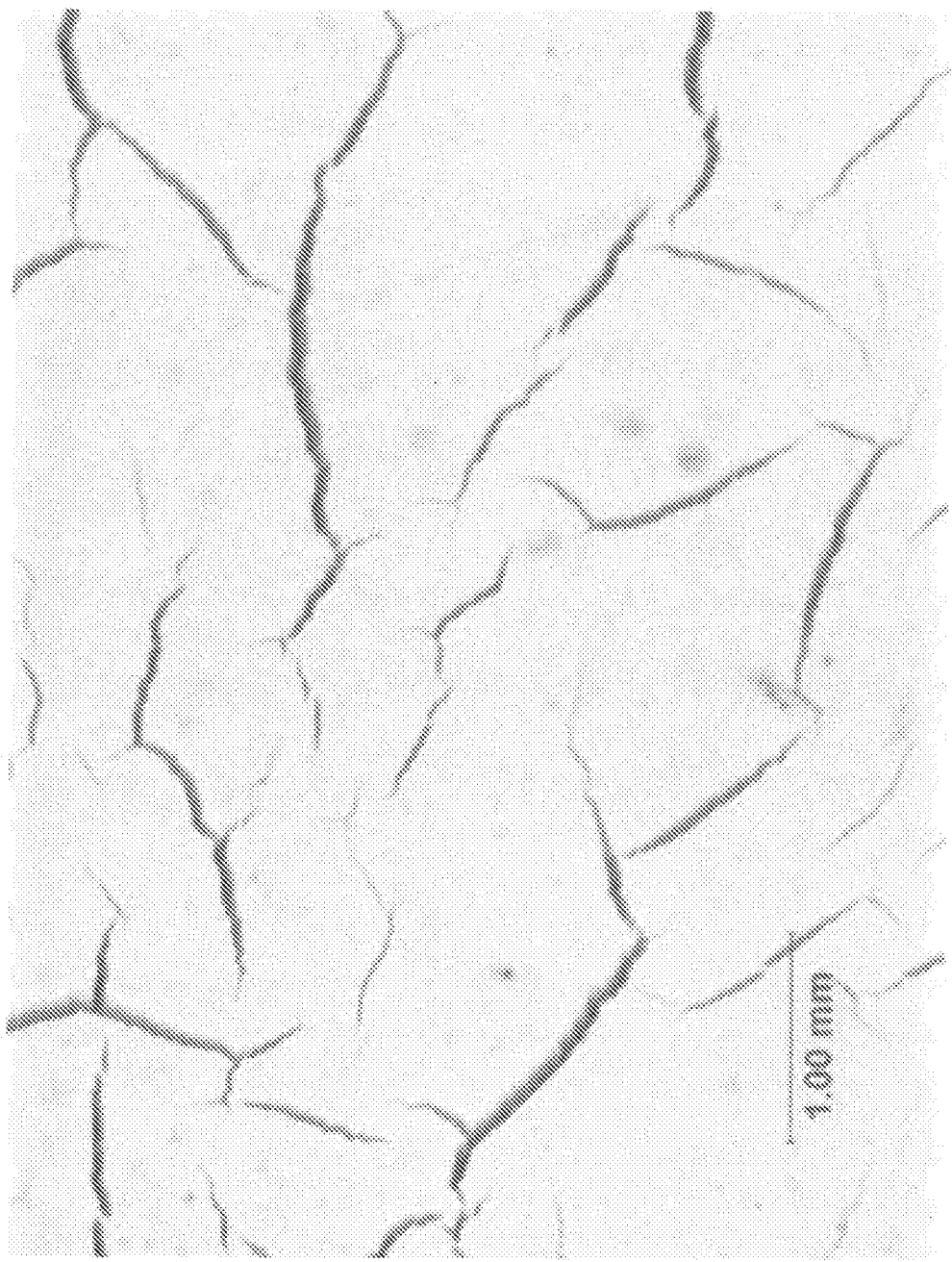

The compositions are applied to e-coated panels and squeezed down to about 3 mm by pushing down with a flat panel on top of release paper. The release paper is removed the next day and the composition is allowed to cure for 7 days at 50 percent relative humidity and 23° C. After 7 days, the panels are placed in a Xenon Weather-O-Meter for direct exposure to the UV light following SAE cycle J-1.885. The samples are inspected after 1000 hours. Micrographs of two examples with the composition of the invention FIGS. 2 and 4, one example with no stabilizers FIG. 1 and one with conventional stabilizers at a concentration of 2 percent after 1000 hours of Weather-O-Meter FIG. 3.

Examples 5 to 11

The components listed in Table 2 are used to prepare compositions tested for durability.

Compounding Examples 5 Through 11

The Example 5 composition is compounded by adding two thirds of the prepolymer, along with the biuret of HDI and an aminosilane, P-toluenesulfonyl isocyanate, diisononyl phthalate, calcium carbonates, and titanium dioxide to a Meyer mixer with a high speed disperser and a sweeper blade or a double planetary Ross mixer. These components are mixed under vacuum for 60 minutes, the vacuum is broken with dry nitrogen and the mixer is open to scrape down the blades and sides of mixer. Fumed silica is then added and the batch is mixed for 20 minutes under vacuum. Once a smooth appearance is confirmed, the rest of the prepolymer and 2,2'-dimorpholino diethyl ether are added. The batch is mixed for 20 minutes under vacuum then downloaded and packaged. Example 6 to 11 are prepared as described with respect to Example 5 with the following changes. In Example 6 (4-hydroxy TEMPO) dissolved in diisononyl phthalate is added. The composition of Example 7 is made by placing 300 g of the mixture of Example 5 into a 1-liter Ross double planetary mixer and adding 6 g of titanium dioxide, 0.75 g of 2,2'-dimorpholino diethyl ether, 1 g of Tinuvin 765, 1 g of Tinuvin 571 and 1 g of tris(nonylphenyl)phosphate, mixing for 15 minutes and packaging.

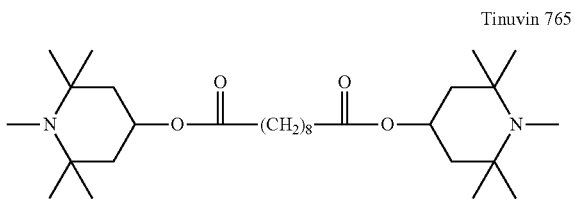

Tinuvin 765

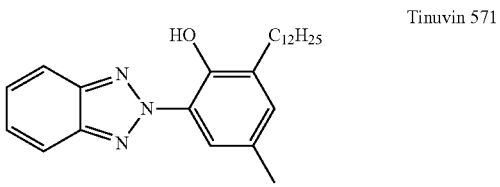

Tinuvin 571

TABLE 2

| Component\Example | 5 | 6 | 7 | 8 | 9 | 10 | 11 |
|---|---|---|---|---|---|---|---|
| Prepolymer prepared from polyether diol, polyether triol and MDI | 35.35 | 35.3 | 35.35 | 35.35 | 35.35 | 35.35 | 35.35 |
| Reaction product of biuret of HDI and an aminosilane | 4 | 4 | 4 | 4 | 4 | 4 | 4 |
| P-toluenesulfonyl isocyanate | 0.6 | 0.6 | 0.6 | 0.6 | 0.6 | 0.6 | 0.6 |
| Diisononyl phthalate | 15 | 15 | 15 | 15 | 15 | 15 | 15 |
| Ground calcium carbonate | 3.8 | 3.4 | 3.8 | 3.8 | 3.8 | 3.8 | 3.8 |
| Precipitated coated calcium carbonate | 35 | 33 | 35 | 35 | 35 | 35 | 35 |
| Titanium dioxide | 4 | 6 | 6 | 6 | 6 | 6 | 6 |
| Fumed silica | 2 | 2 | 2 | 2 | 2 | 2 | 2 |
| 2,2'-dimorpholino diethyl ether | 0.25 | 0.5 | 0.5 | 0.5 | 0.5 | 0.5 | 0.5 |
| 4-Hydroxy TEMPO | | 0.2 | | | | | |
| Tinuvin 765 | | | 0.33 | 0.66 | | | |
| Tinuvin 571 | | | 0.33 | 0.66 | | | |
| Tris(nonylphenyl)phosphite | | | 0.33 | 0.66 | | | |
| BNX 565 | | | | | 0.2 | 1 | 2 |
| Total | 100 | 100 | 103.24 | 104.23 | 102.45 | 103.25 | 104.25 |

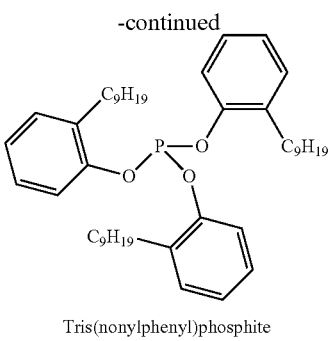

Tris(nonylphenyl)phosphite

Example 8 is made by placing 300 g of Example 5 into a 1-liter Ross double planetary mixer and adding 6 g of titanium dioxide, 0.75 g of 2,2'-dimorpholino diethyl ether, 2 g of Tinuvin 765, 2 g of Tinuvin 57.1 and 2 g of tris(nonylphenyl)phosphate, mixing for 15 minutes and packaging. Example 9 is prepared by placing 300 g of Example 5 into a 1-liter Ross double planetary mixer and adding 6 g of titanium dioxide, 0.75 g of 2,2'-dimorpholino diethyl ether and 0.6 g of BNX 565 stabilizer, mixing for 15 minutes and packaging. Example 10 is made by placing 300 g of Example 5 into a 1-liter Ross double planetary mixer and adding 6 g of titanium dioxide, 0.75 g of 2,2'-dimorpholino diethyl ether and 3 g of BNX 565 stabilizer, mixing for 15 minutes and packaging.

BNX 565

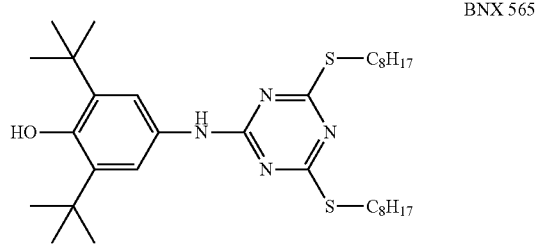

Example 11 is made by placing 300 g of Example 5 into a 1-liter Ross double planetary mixer and adding 6 g of titanium dioxide, 0.75 g of 2,2'-dimorpholino diethyl ether and 6 g of BNX 565 stabilizer, mixing for 15 minutes and packaging.

Micrograph Process

Once the samples were taken out of the Xenon-WOM, they are photographed using a microscope. The microscope used is model Nikon SMZ1500 from Nikon. The microscope is connected to a computer using Spot for Windows Version 4.0.8 software from Diagnostic Instruments Inc. A Fostec light source from Schott-Fostec is used to illuminate the samples. The intensity for the Fostec light source is set at 80 and the magnification is set at 2×, under those settings a white balance is performed with the Spot software by placing a white sheet of paper under the microscope. The samples are placed under the microscope with the same settings and moved around until the most representative section of the entire sample is found. The images are then captured using the Spot software and a 1 mm calibration mark is added using the same software to give a reference scale for the observed degradation of the samples. Micrographs of the samples exposed to 1000 hours in the Weather-O-Meter are shown in FIGS. 5 to 11 for Examples 5 to 11 respectively The figures show that compositions containing 4-hydroxy TEMPO exhibit significantly less cracking after 1000 hours (FIG. 6) of Weather-O-Meter exposure as compared to tradition stabilizers and no stabilizers (FIGS. 5 and 7 to 11).

What is claimed is:

1. A composition comprising
   a) about 20 to about 70 percent by weight of one or more of one or more isocyanate functional prepolymers having an isocyanate content of about 0.5 to about 5.0 percent by weight based on the weight of the isocyanate prepolymers and one or more oligomers or prepolymers containing isocyanate functional groups and alkoxysilane groups;
   b) about 0.1 to about 2 percent by weight of one or more catalysts for the reaction of isocyanate moieties with active hydrogen atom containing groups;
   c) one or more compounds comprising a dihydrocarbyl hydroxyl amine, an alicyclic hydroxyl amine, a nitroxyl of a dihydrocarbyl hydroxyl amine or a nitroxyl of an alicyclic hydroxyl amine in an amount of about 0.01 to about 2.0 percent by weight; and
   d) about 0.01 to about 25 percent by weight of a pigment selected from zinc oxide, cerium oxide, titanium dioxide, phthalocyanines, anthraquinones, perylenes, carbazoles, monoazo- and disazobenzimidazolones, isoindolinones, monoazonaphthols, di-arylidepyrazolones, rhodamines, indigoids, quinacridones, diazo-pyranthrones, dinitranilines, pyrazolones, dianisidines, pyranthrones, tetrachloroisoindolinones, dioxazines, monoazo acrylides, anthrapyrimidines and mixtures thereof;
   e) about 5 to about 40 percent by weight of one or more plasticizers, and
   f) about 5 to about 75 percent by weight of one or more fillers;
   wherein the amounts recited are based on the weight of the composition and the composition forms a cross-linked polyurethane upon cure.

2. A composition according to claim 1 wherein the pigment is a white pigment.

3. A composition according to claim 1 wherein the pigment is titanium dioxide.

4. A composition according to claim 1 wherein the one or more hydroxyl amines correspond to the formula $(R^1)_2N$—OH and the nitroxyls correspond to the formula $(R^1)_2$—N—O. wherein $R^1$ is independently in each occurrence a hydrocarbyl moiety or two $R^1$ form a cyclic ring and the hydrocarbyl moieties may be substituted with a substituent which does not interfere in stabilizing the composition, wherein the substituent is hydroxyl, alkyl groups, ethers, tertiary amines or sulfides.

5. A composition according to claim 4 wherein the component c is a nitroxyl.

6. A composition according to claim 1 which further comprises a second stablilizer selected from ultraviolet stabilizers, durability stabilizers and light stabilizers.

7. A composition comprising:
   a) about 20 to about 70 percent by weight of one or more of one or more isocyanate functional prepolymers having an isocyanate content of about 6 to 35 percent by weight based on the weight of the isocyanate prepolymer and one or more oligomers or prepolymers containing isocyanate functional groups and alkoxysilane groups;
   b) about 0.1 to about 2 percent by weight of one or more catalysts for the reaction of isocyanate moieties with active hydrogen atom containing groups;
   c) one or more compounds comprising a dihydrocarbyl hydroxyl amine, an alicyclic hydroxyl amine, a nitroxyl of a dihydrocarbyl hydroxyl amine or a nitroxyl of an alicyclic hydroxyl amine in an amount of about 0.01 to about 2.0 percent by weight; and d) about 0.01 to about 25 percent by weight of a pigment selected from zinc oxide, cerium oxide, titanium dioxide, phthalocyanines, anthraquinones, perylenes, carbazoles, monoazo- and disazobenzimidazolones, isoindolinones, monoazonaphthols, di-arylidepyrazolones, rhodamines, indigoids, quinacridones, diazo-pyranthrones, dinitranilines, pyrazolones, dianisidines, pyranthrones, tetrachloroisoindolinones, dioxazines, monoazo acrylides, anthrapyrimidines and mixtures thereof;

e) about 5 to about 40 percent by weight of one or more plasticizers; and f) about 5 to about 75 percent by weight of the one or more fillers;

wherein the composition is a two part composition wherein part 1 comprises one or more isocyanate functional components or one or more oligomers or prepolymers containing isocyanate functional groups and alkoxysilane groups; part 2 comprises one or more catalysts for the reaction of isocyanate moieties with active hydrogen atom containing groups and one or more components containing more than one active hydrogen containing groups; wherein the one or more compounds comprising a dihydrocarbyl hydroxyl amine, an alicyclic hydroxyl amine, a nitroxyl of a dihydrocarbyl hydroxyl amine or a nitroxyl of an alicyclic hydroxyl amine and the pigment may be present in part 1, part 2 or both; the amounts recited are based on the weight of the composition and the composition forms a cross-linked polyurethane upon cure.

8. A composition comprising a) about 20 to about 70 percent by weight of one or more isocyanate functional components comprising one or more oligomers or prepolymers containing isocyanate functional groups and alkoxysilane groups;

b) about 0.1 to about 2 percent by weight of one or more catalysts for the reaction of isocyanate moieties with active hydrogen atom containing groups; and c) one or more compounds comprising a dihydrocarbyl hydroxyl amine, an alicyclic hydroxyl amine, a nitroxyl of a dihydrocarbyl hydroxyl amine or a nitroxyl of an alicyclic hydroxyl amine in an amount of about 0.01 to about 2.0 percent by weight of the composition to resist degradation of the composition in a cured state;

d) about 5 to about 40 percent by weight of one or more plasticizers; and;

e) about 5 to about 75 percent by weight one or more fillers;

wherein the amounts are based on the weight of the composition and the composition forms a cross-linked polyurethane upon cure.

9. A method of bonding two or more substrates together which comprises contacting the two or more substrates together with a composition according to claim 1 disposed along at least a portion of the area wherein the substrates are in contact.

10. A method of bonding two or more substrates together which comprises contacting the two or more substrates together with a composition according to according to claim 9 disposed along at least a portion of the area wherein the substrates are in contact wherein the composition is a two part composition and the parts are contacted together prior to contacting the composition with one or more of the substrates.

11. A method according to claim 9 wherein at least one of the substrates is a non-structural component and at least one of the other substrates is a building or a vehicle.

12. A method comprising applying a composition according to claim 1 along adjoining surfaces of two components in a structure and allowing the composition to cure such that the space between the adjoining surfaces is sealed.

13. A composition according to claim 1 wherein the one or more isocyanate functional components are isocyanate functional prepolymers which are the reaction product of a mixture of one or more polyether diols and one or more polyether triols.

14. A composition according to claim 1 wherein the composition includes a polyfunctional isocyanate.

\* \* \* \* \*